(12) United States Patent
Itou et al.

(10) Patent No.: US 10,715,077 B2
(45) Date of Patent: Jul. 14, 2020

(54) METHOD OF CONTROLLING MOTOR AND DEVICE OF CONTROLLING MOTOR

(71) Applicant: Nissan Motor Co., Ltd., Kanagawa (JP)

(72) Inventors: Ken Itou, Kanagawa (JP); Kohei Murota, Kanagawa (JP); Tomoaki Mori, Kanagawa (JP); Naoki Takahashi, Kanagawa (JP); Hiromichi Kawamura, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/346,749

(22) PCT Filed: Nov. 1, 2016

(86) PCT No.: PCT/JP2016/082495
§ 371 (c)(1),
(2) Date: May 1, 2019

(87) PCT Pub. No.: WO2018/083744
PCT Pub. Date: May 11, 2018

(65) Prior Publication Data
US 2019/0305713 A1 Oct. 3, 2019

(51) Int. Cl.
| | |
|---|---|
| *G05B 5/00* | (2006.01) |
| *G05D 23/00* | (2006.01) |
| *H02H 7/08* | (2006.01) |
| *H02P 29/64* | (2016.01) |
| *H02P 29/40* | (2016.01) |
| *H02P 3/02* | (2006.01) |

(Continued)

(52) U.S. Cl.
CPC ............... *H02P 29/64* (2016.02); *H02P 3/02* (2013.01); *H02P 21/22* (2016.02); *H02P 29/40* (2016.02); *H02P 31/00* (2013.01)

(58) Field of Classification Search
CPC ................................. H02P 29/64; H02P 21/22
USPC ......................................................... 318/471
See application file for complete search history.

(56) References Cited

U.S. PATENT DOCUMENTS

| | | | | |
|---|---|---|---|---|
| 4,938,437 | A * | 7/1990 | Rausch ................. | B29D 30/48 152/527 |
| 2005/0174090 | A1* | 8/2005 | Hayashi ................. | H02P 21/06 318/807 |

(Continued)

FOREIGN PATENT DOCUMENTS

| | | |
|---|---|---|
| CN | 102916643 A | 2/2013 |
| CN | 105576903 A | 5/2016 |

(Continued)

*Primary Examiner* — Erick D Glass
(74) *Attorney, Agent, or Firm* — Osha Liang LLP

(57) ABSTRACT

A method of controlling a motor having windings of a plurality of phases includes an estimation step of calculating a current vector norm from d-axis current and q-axis current flowing in the motor, calculating power loss from the current vector norm and the entire heat resistance of the motor, and estimating the maximum temperature of the windings of the plurality of phases based on the power loss and a transfer function having first or higher-order transfer characteristics, in the case where the motor is in a low rotation state, and a limiting step of limiting input power based on the maximum temperature estimated in the estimation step.

15 Claims, 21 Drawing Sheets

(51) Int. Cl.
*H02P 31/00* (2006.01)
*H02P 21/22* (2016.01)

(56) References Cited

U.S. PATENT DOCUMENTS

| | | | |
|---|---|---|---|
| 2008/0024080 A1* | 1/2008 | Ogawa | B62D 5/046 |
| | | | 318/432 |
| 2013/0028292 A1 | 1/2013 | Senoo | |
| 2013/0033210 A1 | 2/2013 | Suzuki et al. | |
| 2013/0069579 A1 | 3/2013 | Uematsu et al. | |
| 2014/0112369 A1 | 4/2014 | Senoo | |
| 2014/0159754 A1* | 6/2014 | Turner | G01R 27/08 |
| | | | 324/721 |
| 2016/0126877 A1 | 5/2016 | Endoh | |

FOREIGN PATENT DOCUMENTS

| | | |
|---|---|---|
| JP | H06-038544 A | 2/1994 |
| JP | 2003-164185 A | 6/2003 |
| JP | 2005-229661 A | 8/2005 |
| JP | 2010-111265 A | 5/2010 |
| JP | 2010-148322 A | 7/2010 |
| JP | 2013-70485 A | 4/2013 |
| KR | 2013-0123866 A | 11/2013 |

\* cited by examiner

METHOD OF CONTROLLING MOTOR AND DEVICE OF CONTROLLING MOTOR

BACKGROUND

Technical Field

The present invention relates to a method of controlling a motor and a device of controlling a motor.

Related Art

A synchronous motor is generally configured to be driven in a plurality of phases like U, V, and W phases. In this permanent magnet type motor, current flows through windings (coil) provided so as to correspond to respective phases, which rotationally drives the motor.

The windings of the respective phases generate heat when current flows. In the case of a large amount of heat generation, however, an insulation member of the windings could be deteriorated. Therefore, in the case where the temperature of the windings is extremely high, the current flowing through the windings needs to be limited in order to reduce the heat generation. Accordingly, a wide variety of techniques have been studied to estimate the temperatures of the windings in a motor (for example, JP2013-070485A).

SUMMARY OF INVENTION

In the case where the motor is in a low rotation state, where the motor is locked so as to generate a torque without rotation, current flows in a specific phase (for example, a U phase), by which only a part of the motor has a high temperature in some cases. Therefore, even in the case of using a technique of enabling the provision of a temperature sensor in the motor, the temperature in a part of the inside of the motor exceeding an estimated temperature does not allow an appropriate estimation of the temperature, by which the insulation part of the windings could be deteriorated.

Therefore, a motor control method according to one or more embodiments of the present invention and a motor control device according to one or more embodiments of the present invention may be capable of protecting a motor in a low rotation region by estimating the maximum temperature of the motor.

According to one or more embodiments of the present invention, A method of controlling motor is a method for controlling a motor having windings of a plurality of phases, including an estimation step of estimating the maximum temperature of the winding of a phase that reaches the highest temperature among the windings of the plurality of phases, in accordance with the magnitude of input power that is input to the motor, in the case where the motor is in a low rotation state, and a limiting step of limiting the input power on the basis of the maximum temperature estimated in the estimation step.

DETAILED DESCRIPTION

Hereinafter, embodiments of the present invention will be described with reference to appended drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

A motor control device according to a first embodiment of the present invention will be described.

Figure 1:
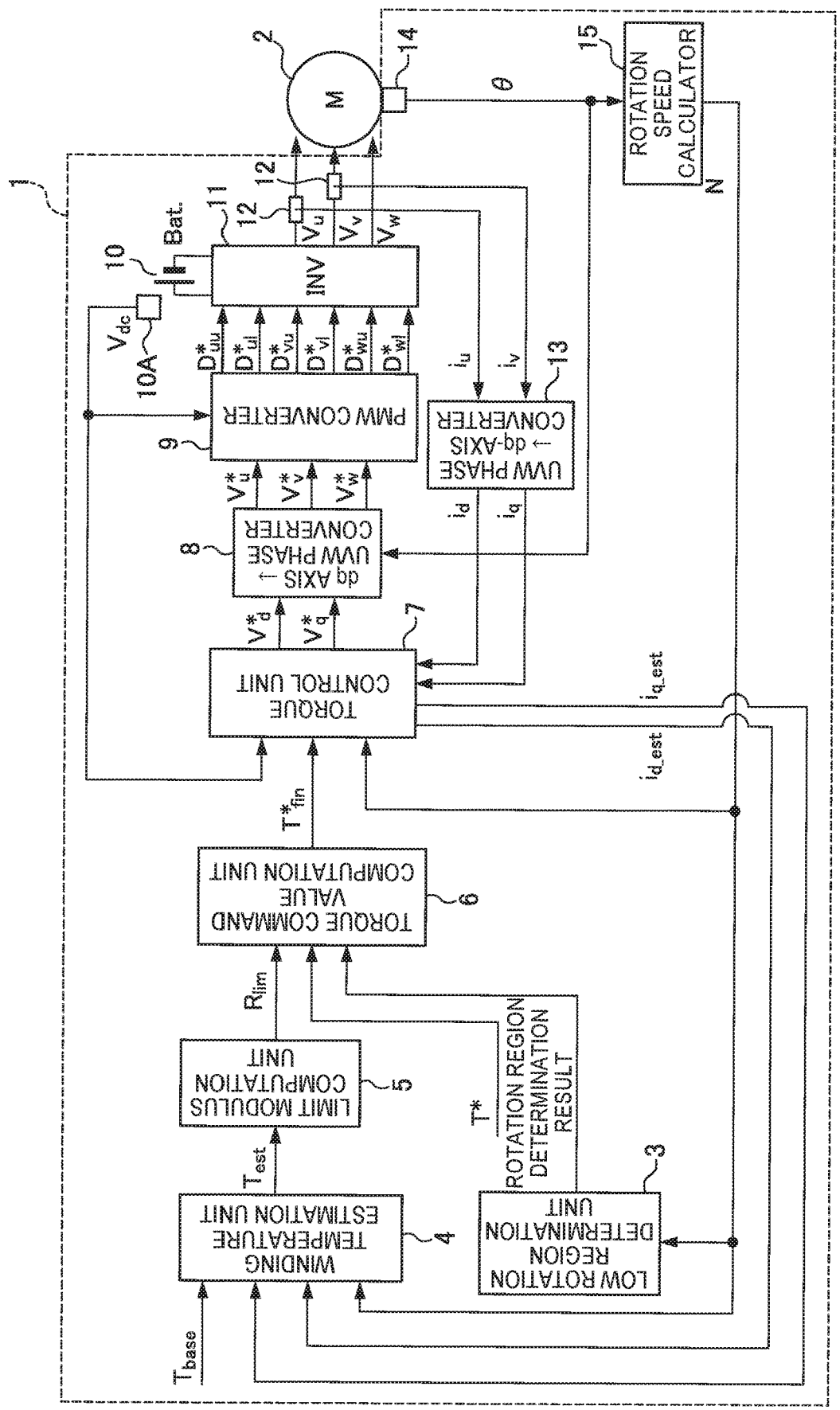
FIG. 1 is a schematic block diagram of a motor control device according to a first embodiment.

FIG. 1 is a schematic block diagram of the motor control device according to the first embodiment. According to this diagram, the motor control device 1 controls a motor 2. The motor 2 includes windings of a plurality of phases and is able to be used as a drive source for an electric vehicle or the like.

The following describes a detailed configuration of the motor control device 1. The motor control device 1 includes a controller, not illustrated, which performs programmed processes. Processes of respective blocks are stored as programs in the controller, and the process of each block is performed by executing the corresponding program.

In the low rotation region determination unit 3, a rotation speed calculator 15 inputs a rotation speed detection value N indicating the rotation speed of the motor 2. The low rotation region determination unit 3 determines whether the motor 2 is in a low rotation state or in a high rotation state on the basis of the input value and outputs a rotation region determination result indicating a result of the determination to a torque command value computation unit 6. The details of the low rotation region determination unit 3 will be described later with reference to FIG. 2. Incidentally, the torque command value computation unit 6 is an example of a limiting unit, which performs a limiting step.

The winding temperature estimation unit 4 receives inputs of a d-axis current estimated value $i_{d\_est}$ and a q-axis current estimated value $i_{q\_est}$ from a torque control unit 7 and receives an input of a reference temperature $T_{base}$ from a host system not illustrated. The winding temperature estimation unit 4 computes an estimated maximum temperature $T_{est}$ on the basis of the input values. Instead of the d-axis current estimated value $i_{d\_est}$ and the q-axis current estimated value $i_{q\_est}$, a d-axis current value $i_d$ and a q-axis current value $i_q$, which are output from the UVW phase→dq-axis converter 13, may be used. The details of the winding temperature estimation unit 4 will be described later with reference to FIG. 3. The winding temperature estimation unit 4 is an example of an estimation unit, which performs an estimation step. Incidentally, the reference temperature $T_{base}$ is a temperature measured by a sensor provided in the outside of the motor 2. For example, in the case where the motor 2 is provided in an electric vehicle, the reference temperature $T_{base}$ is an outside air temperature sensor detection value, a cooling system temperature sensor detection value, or the like.

A limit modulus computation unit 5 calculates a torque limit modulus $R_{lim}$, which is used to limit the drive torque to the motor 2 in accordance with the estimated maximum temperature $T_{est}$. The details of the processing of the limit modulus computation unit 5 will be described later with reference to FIG. 4.

The torque command value computation unit 6 receives an input of a rotation region determination result and inputs of a torque command value T* and a torque limit modulus $R_{lim}$ from the host system not illustrated. The torque command value T* is determined in accordance with an opening of an accelerator pedal of a vehicle or the like. Additionally, the torque command value computation unit 6 previously stores a torque upper limit value $Trq_{lim\_upper}$ and a torque lower limit value $Trq_{lim\_lower}$, which determine a range in which the torque is settable. The torque command value computation unit 6 computes a final torque command value $T^*_{fin}$ on the basis of the input values and the stored values. The details of the processing of the torque command value computation unit 6 will be described later with reference to FIG. 5.

The torque control unit 7 includes a current vector control unit, which controls a current vector, and a voltage phase control unit, which controls a voltage phase. The torque control unit 7 selects the current vector control or the voltage phase control in accordance with the inputs of the final torque command value $T^*_{fin}$, the battery voltage detection value $V_{dc}$, the rotation speed detection value N, and the d-axis current value $i_d$ and q-axis current value $i_q$ output from the UVW phase→dq-axis converter 13. Additionally, the torque control unit 7 computes a d-axis voltage command value $v^*_d$ and a q-axis voltage command value $v^*_q$ by a selected control method and outputs these voltage command values to a dq axis→UVW phase converter 8. The details of the torque control unit 7 will be described later with reference to FIG. 6.

The dq axis→UVW phase converter 8 converts the d-axis voltage command value $v^*_d$ and the q-axis voltage command value $v^*_q$ to three-phase voltage command values $v^*_u$, $v^*_v$, and $v^*_w$ on the basis of an electric angle detection value θ of the motor 2 according to the following expression and then outputs the converted voltage command values to a PMW converter 9.

[MATH. 1]

$$\begin{bmatrix} v^*_u \\ v^*_v \\ v^*_w \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v^*_d \\ v^*_q \end{bmatrix} \quad (1)$$

The PMW converter 9 outputs power element drive signals $D_{uu}^*$, $D_{ui}^*$, $D_{vu}^*$, $D_{vl}^*$, $D_{wu}^*$, and $D_{wl}^*$ of an inverter 11 on the basis of the three-phase voltage command values $v^*_u$, $v^*_v$, and $v^*_w$ and a battery voltage detection value $V_{dc}$ output from a voltage sensor 10A disposed on the side of the battery 10.

The inverter 11 performs operations based on the power element drive signals generated by the PMW converter 9 to apply the three-phase voltages $v_u$, $v_v$, and $v_w$ to the motor 2.

The current detector 12 is provided on wiring of at least two phases in the three-phase wiring between the motor control device 1 and the motor 2. For example, the current detector 12 detects a U-phase current value $i_u$ and a V-phase current value $i_v$.

The UVW phase→dq-axis converter 13 performs conversion based on the electric angle detection value θ for the U-phase current value $i_u$ and the V-phase current value $i_v$ according to the following expression to calculate the d-axis current value $i_d$ and the q-axis current value $i_q$ and outputs these current values to the torque control unit 7.

[MATH. 2]

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ -i_u - i_v \end{bmatrix} \quad (2)$$

The rotor position sensor 14 is disposed on the side of the motor 2. Upon detecting the electric angle detection value θ of the motor 2, the rotor position sensor 14 outputs the detection value to the rotation speed calculator 15. The rotor position sensor 14 is an example of a configuration for performing a measurement step.

The rotation speed calculator 15 finds the amount of change obtained at predetermined intervals with respect to the electric angle detection value θ to compute the rotation speed detection value N. The rotation speed calculator 15 outputs the rotation speed detection value N to the low rotation region determination unit 3, the winding temperature estimation unit 4, and the torque control unit 7.

The following describes a part of the configuration described with reference to FIG. 1 in detail.

Figure 2:
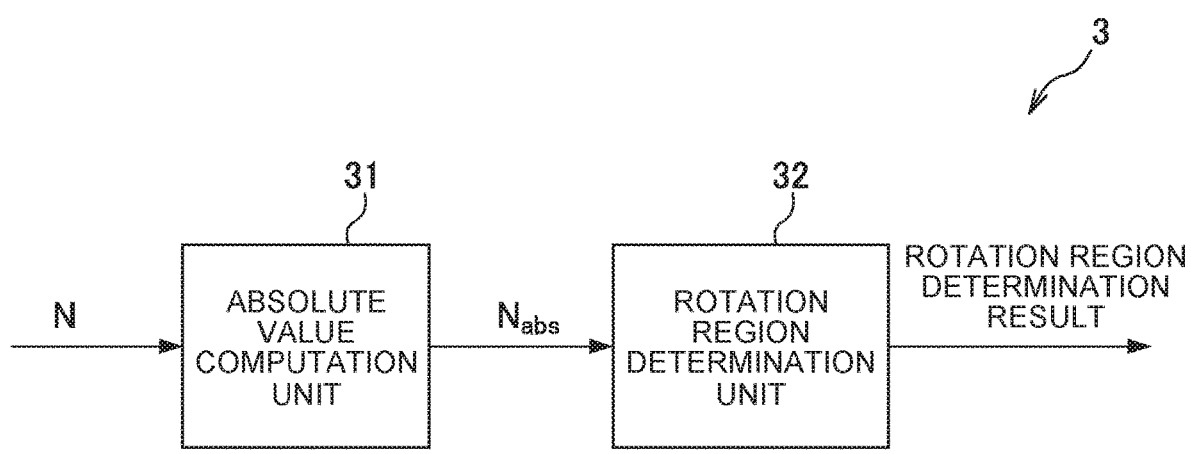
FIG. 2 is a detailed block diagram of a low rotation region determination unit.

FIG. 2 illustrates a detailed configuration of the low rotation region determination unit 3.

The low rotation region determination unit 3 includes an absolute value computation unit 31 and a rotation region determination unit 32.

The absolute value computation unit 31 finds a rotation speed absolute value $N_{abs}$, which is an absolute value of the input rotation speed detection value N, and then outputs the rotation speed absolute value $N_{abs}$ to the rotation region determination unit 32.

The rotation region determination unit 32 performs determination based on the following expression with respect to the rotation speed absolute value $N_{abs}$ and then determines whether or not the motor 2 is in the low rotation state.

[MATH. 3]

$N_{abs} < N_{th\_low}$: Lo(Low rotation region)

$N_{abs} \geq N_{th\_low}$: (High rotation region)  (3)

Figure 3:
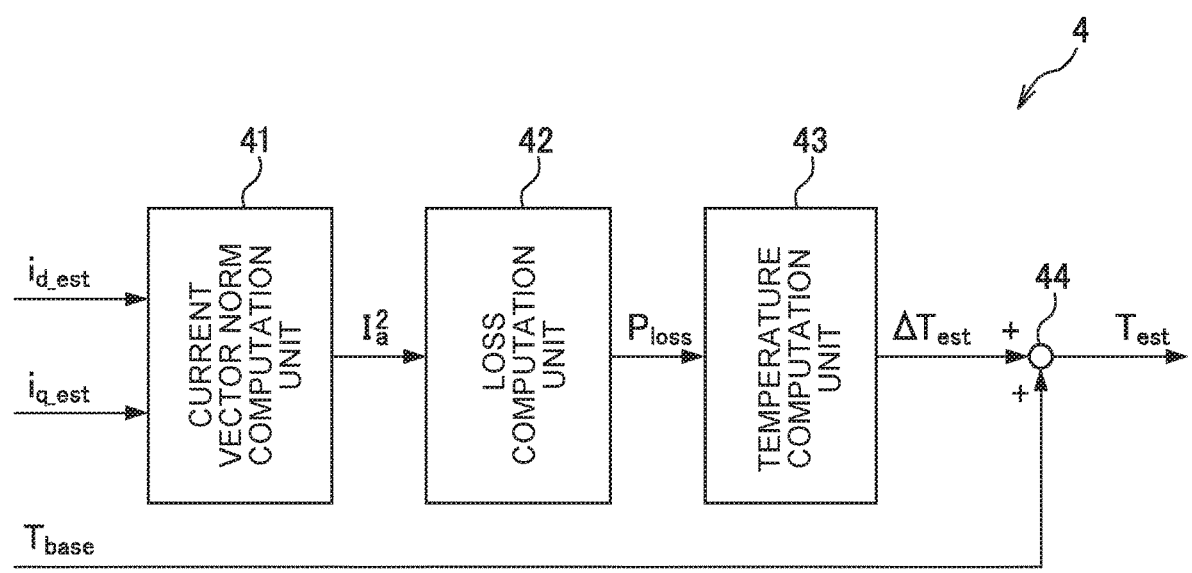
FIG. 3 is a detailed block diagram of a winding temperature estimation unit.

Specifically, the rotation region determination unit 32 outputs "Lo" indicating a low rotation region as a rotation region determination result if the rotation speed absolute value $N_{abs}$ is lower than the low rotation threshold value $N_{th\_low}$. On the other hand, if the rotation speed absolute value $N_{abs}$ is equal to or greater than the low rotation threshold value $N_{th\_low}$, the rotation region determination unit 32 outputs "Hi" indicating a high rotation region. At the low rotation threshold value $N_{th\_low}$, the rotation speed of the motor 2 is low and the amount of electricity supplied to the windings of some phases is high. The low rotation region includes a state in which the motor 2 is locked, FIG. 3 is a diagram illustrating the details of the winding temperature estimation unit 4.

A current vector norm computation unit 41 calculates a current vector norm value $I_a^2$ according to the following expression on the basis of the inputs of the d-axis current estimated value $i_{d\_est}$ and the q-axis current estimated value $i_{q\_est}$. The current vector norm computation unit 41 then outputs the current vector norm value $I_a^2$ to a loss computation unit 42.

[MATH. 4]

$I_a^2 = I_{d\_est}^2 + I_{q\_est}^2$  (4)

The loss computation unit 42 calculates a power loss $P_{loss}$ by multiplying the current vector norm value $I_a^2$ by a heat resistance $R_{loss}$ of the entire motor 2 and outputs the calculated power loss $P_{loss}$ to a temperature computation unit 43. The power loss $P_{loss}$ indicates an input power input to the motor 2 and includes not only energy used for rotationally driving the motor 2, but also energy of heat loss.

The temperature computation unit 43 is a heat circuit model. This heat circuit model is used in the case where the motor 2 is in a low rotation region and is indicated by a transfer function G(s) with an output of an estimated changed temperature $\Delta T_{est}$, which is the maximum temperature rise in the three-phase windings of the motor 2, for the input of the power loss $P_{loss}$. The temperature computation unit 43 performs computation based on the transfer function G(s) for the power loss $P_{loss}$ to calculate the estimated changed temperature $\Delta T_{est}$. The transfer function G(s) has first- or higher-order dynamic characteristics.

An adder 44 adds the reference temperature $T_{base}$ to the estimated changed temperature $\Delta T_{est}$ to calculate the estimated maximum temperature $T_{est}$ of a winding having a phase that reaches the highest temperature among the windings of the plurality of phases of the motor 2.

Figure 4:
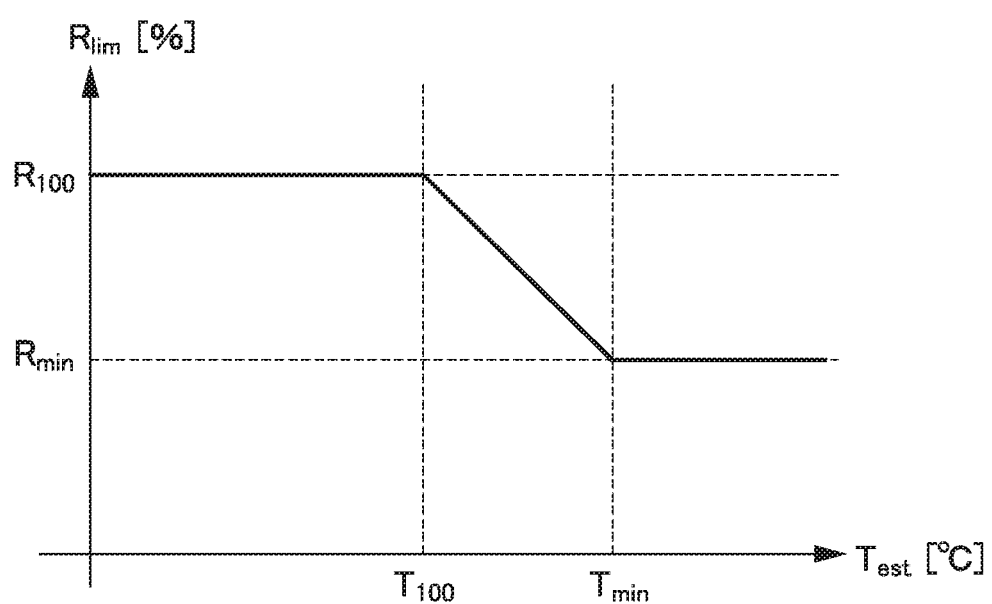
FIG. 4 is a graph for use in processing of a limit modulus computation unit.

FIG. 4 is a graph illustrating a relationship between the estimated maximum temperature $T_{est}$ and the torque limit modulus $R_{lim}$, which is used for processing in the limit modulus computation unit 5. According to this graph, in the case where the estimated maximum temperature $T_{est}$ is lower than the temperature threshold value $T_{100}$, which is an upper limit temperature where the torque is not limited, the torque limit modulus $R_{lim}$ is $R_{100}$ (100%).

The torque limit modulus $R_{lim}$ includes a torque limitation lower limit value $R_{min}$ capable of preventing insulation deterioration caused by a high temperature of windings. Furthermore, the motor 2 is able to prevent insulation deterioration at a certain temperature by limitation with the torque limitation lower limit value $R_{min}$ even if the estimated maximum temperature $T_{est}$ increases, and the lower limit of the temperature is defined as a temperature threshold value $T_{min}$.

Therefore, in the case where the estimated maximum temperature $T_{est}$ exceeds the temperature threshold value $T_{min}$, the current is limited by using the torque limitation lower limit value $R_{min}$. Further, in the case where the estimated maximum temperature $T_{est}$ is between the temperature threshold value $T_{100}$ and the temperature threshold value $T_{min}$, the torque limit modulus $R_{lim}$ is set so as to decrease as the temperature increases.

Figure 5:
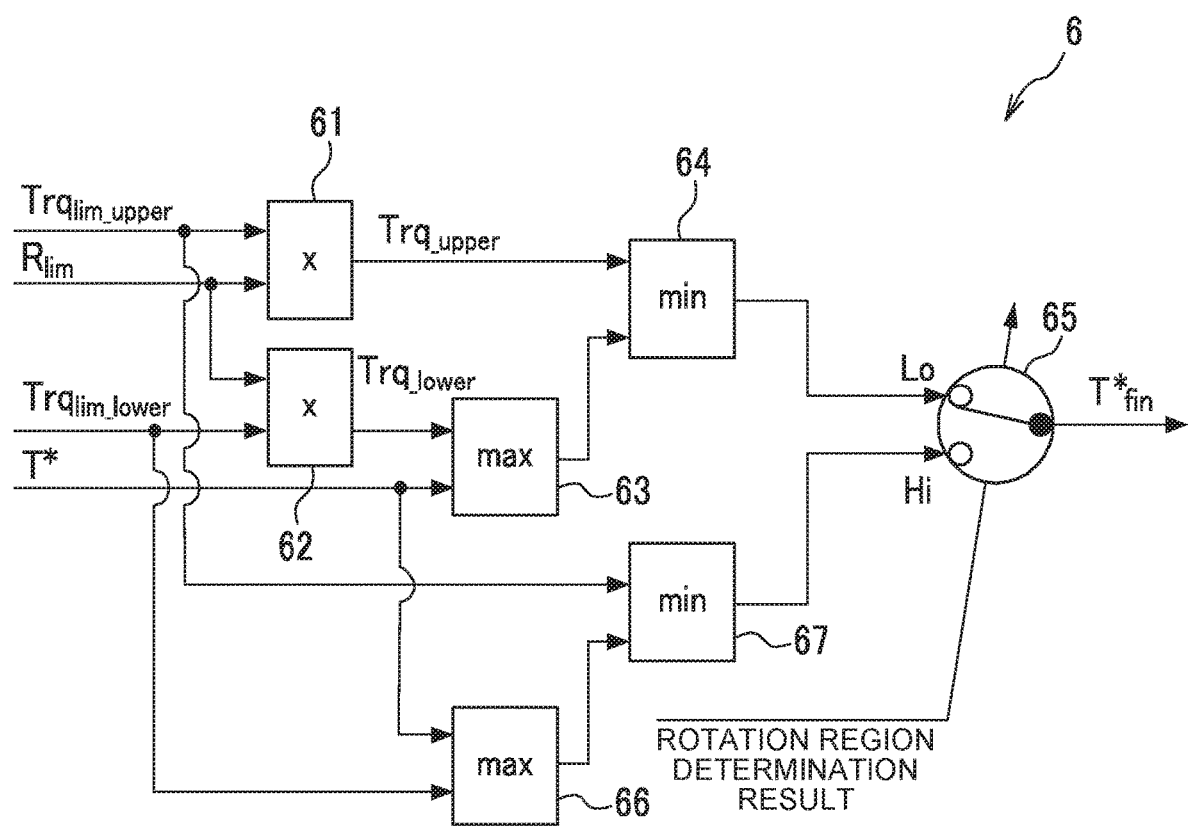
FIG. 5 is a detailed block diagram of a torque command value computation unit.

FIG. 5 is a diagram illustrating the details of the operation of the torque command value computation unit 6.

A multiplier 61 multiplies the torque upper limit value $Trq_{lim\_upper}$ by the torque limit modulus Rum to calculate a limited torque upper limit value $Trq_{\_upper}$. Moreover, a multiplier 62 multiplies the torque lower limit value $Trq_{lim\_lower}$ by the torque limit modulus $R_{lim}$ to calculate a limited torque lower limit value $Trq_{\_lower}$. A comparator 63 compares the limited torque lower limit value $Trq_{\_lower}$ with the torque command value T* and outputs a larger value thereof to a comparator 64. The comparator 64 compares an output value from the comparator 63 with the limited torque upper limit value $Trq_{\_upper}$ and outputs a smaller value thereof to a switch 65.

At the same time, a comparator 66 compares the torque command value T* with the torque lower limit value $Trq_{lim\_lower}$ and outputs a greater value thereof to a comparator 67. The comparator 67 compares an output value from the comparator 66 with the torque upper limit value $Trq_{lim\_upper}$ and outputs a smaller value thereof to the switch 65.

The switch 65 outputs either of the outputs from the comparator 64 and the comparator 67 as a final torque command value $T*_{fin}$ on the basis of a rotation region determination result output from the low rotation region determination unit 3.

Specifically, in the case where the rotation region determination result is Lo (low rotation region), the switch 65 outputs the output from the comparator 64 as the final torque command value $T*_{fin}$. Thereby, the torque command value T* is limited by the limited torque upper limit value $Trq_{\_upper}$ and the limited torque lower limit value $Trq_{\_lower}$ for which the torque limit modulus $R_{lim}$ is considered. This reduces the amount of heat generation of the motor 2, thereby preventing the insulation deterioration of the windings.

On the other hand, in the case where the rotation region determination result is Hi (high rotation region), the switch 65 outputs the output from the comparator 67 as the final torque command value $T*_{fin}$. Therefore, the torque command value T* is limited by the torque upper limit value $Trq_{lim\_upper}$ and the torque lower limit value $Trq_{lim\_lower}$ for which the torque limit modulus $R_{lim}$ is not considered.

Figure 6:
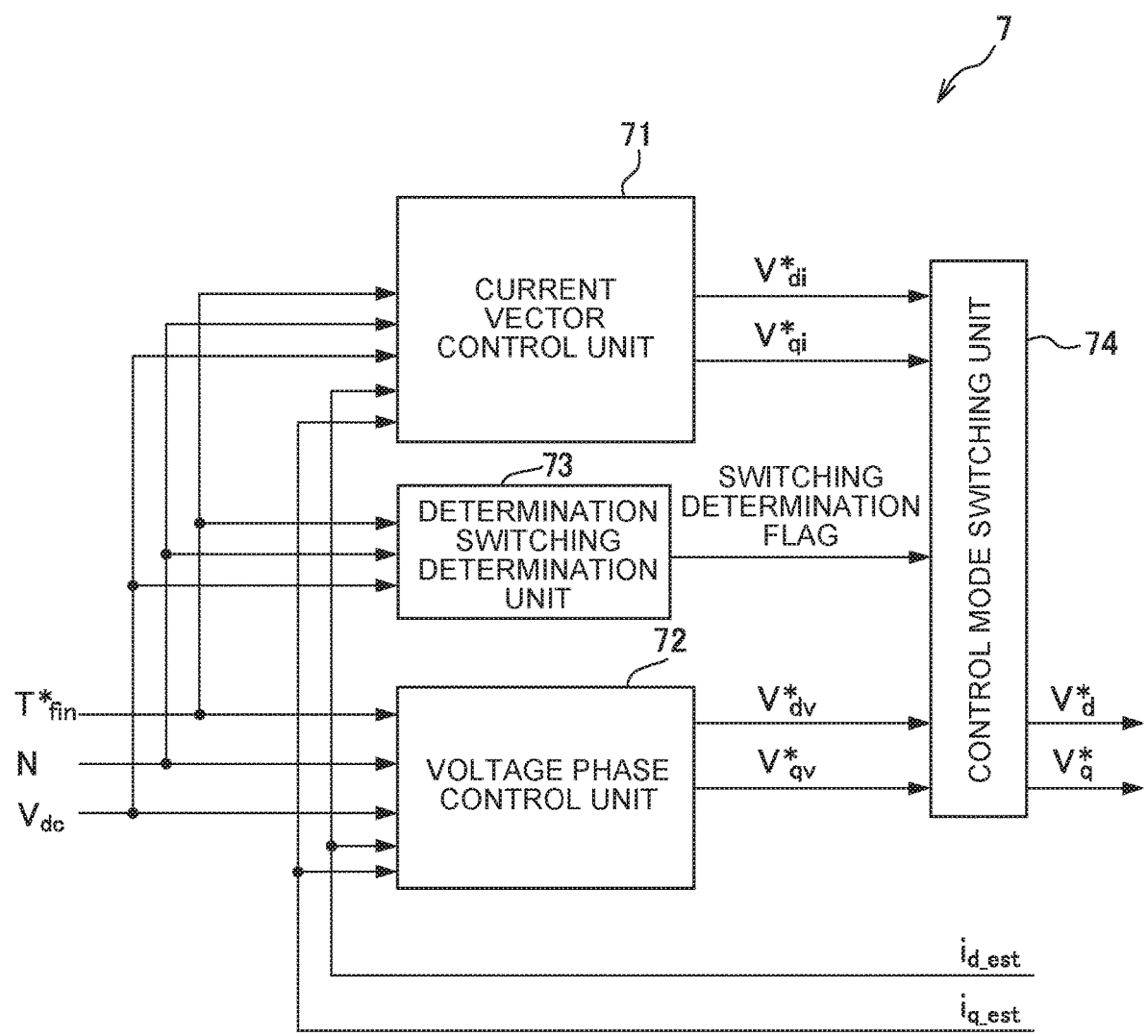
FIG. 6 is a detailed block diagram of a torque control unit.

FIG. 6 is a detailed block diagram of the torque control unit 7.

The torque control unit 7 includes a current vector control unit 71, a voltage phase control unit 72, a control switching determination unit 73, and a control mode switching unit 74. In response to a result of determination by the control switching determination unit 73, the control mode switching unit 74 controls the motor 2 by using an output from the current vector control unit 71 or the voltage phase control unit 72.

The current vector control unit 71 receives inputs of the final torque command value $T^*_{fin}$, the rotation speed detection value N, the battery voltage detection value $V_{dc}$, the d-axis current estimated value $i_{d\_est}$, and the q-axis current estimated value $i_{q\_est}$. The current vector control unit 71 calculates current vector control voltage command values $v^*_{di}$ and $v^*_{qi}$ for use in current vector control on the basis of the above input values and outputs these command values to the control mode switching unit 74.

The voltage phase control unit 72 receives inputs of the final torque command value $T^*_{fin}$, the rotation speed detection value N, the battery voltage detection value $V_{dc}$, the d-axis current estimated value $i_{d\_est}$, and the q-axis current estimated value $i_{q\_est}$. The voltage phase control unit 72 calculates voltage phase control voltage command values $v^*_{dv}$ and $v^*_{qv}$ for use in voltage phase control on the basis of the above input values and outputs these command values to the control mode switching unit 74.

The control switching determination unit 73 determines which of the current vector control and the voltage phase control is used to control the motor 2. In the case where the motor 2 rotates at a low speed or in a normal speed range, the current vector control is selected. On the other hand, in the case where the motor 2 rotates at high speed and field weakening control is performed, the voltage phase control is selected. The control switching determination unit 73 outputs a switching determination flag indicating a result of the selection to the control mode switching unit 74.

In the case where the switching determination flag indicates the current vector control, the control mode switching unit 74 outputs the current vector control voltage command values $v^*_{di}$ and $v^*_{qi}$ output from the current vector control unit 71 as voltage command values $v^*_d$ and $v^*_q$.

On the other hand, in the case where the switching determination flag indicates the voltage phase control, the control mode switching unit 74 outputs the voltage phase control voltage command values $v^*_{dv}$ and $v^*_{qv}$ output from the voltage phase control unit 72 as voltage command values $v^*_d$ and $v^*_q$.

The following describes the details of the configurations of the current vector control unit 71 and the voltage phase control unit 72.

Figure 7:
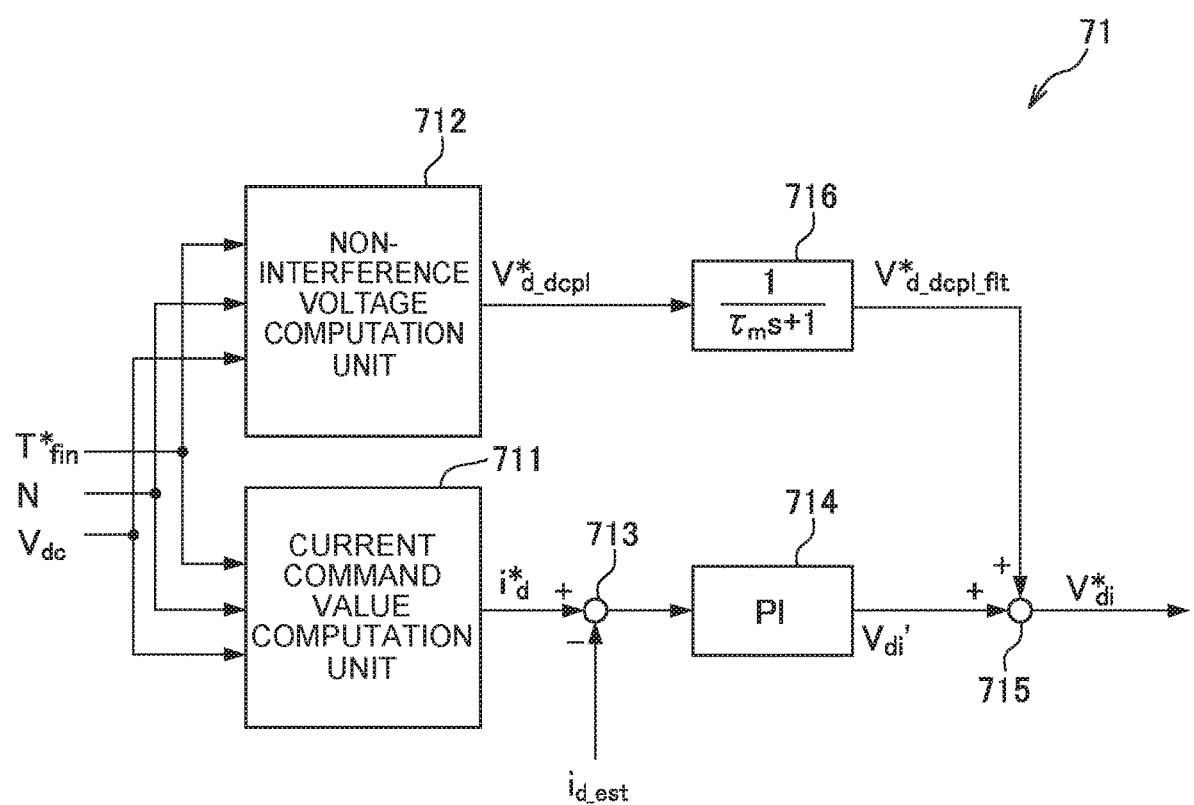
FIG. 7 is a detailed block diagram of a current vector control unit.

FIG. 7 is a block diagram illustrating the details of control with respect to the d axis of the current vector control unit 71. Since the configuration with respect to the q axis is the same as the configuration of the d axis, the description is omitted.

The current vector control unit 71 includes a current command value computation unit 711 that calculates a command value for use in generating a rotation torque appropriate to the final torque command value $T^*_{fin}$ and a non-interference voltage computation unit 712 that calculates a command value for use in reducing interference of the current to a magnetic flux.

First, the calculation of the current command value is described.

The current command value computation unit 711 calculates the current command value $i^*_d$ on the basis of the inputs of the final torque command value $T^*_{fin}$, the rotation speed detection value N, and the battery voltage detection value $V_{dc}$ by using a previously stored table and then outputs the current command value $i^*_d$ to a subtractor 713.

The subtractor 713 subtracts the d-axis current estimated value $i_{d\_est}$ from the current command value $i^*_d$ and outputs a result of the subtraction to the PI computation unit 714.

The PI computation unit 714 finds a d-axis voltage command value $v_{di}'$ by using the following expression to PI-amplify a deviation between the current command value $i^*_d$ and the d-axis current estimated value $i_{d\_est}$. In this expression, it is assumed that $K_{pd}$ and $K_{id}$ indicate a d-axis proportional gain and a d-axis integral gain, respectively.

[MATH. 5]

$$v'_{di} = \frac{K_{pd}s + K_{id}}{s}(i^*_d - i_d) \tag{5}$$

The PI computation unit 714 then outputs the d-axis voltage command value $v_{di}'$ to an adder 715.

The following describes the calculation of a non-interference component.

The non-interference voltage computation unit 712 calculates a d-axis voltage command value $v^*_{d\_dcpl}$ on the basis of the inputs of the final torque command value $T^*_{fin}$, the rotation speed detection value N, and the battery voltage detection value $V_{dc}$ by using a previously stored table. The non-interference voltage computation unit 712 then outputs the voltage command value $v^*_d$ to a filter 716.

The filter 716, which has the characteristics of a transfer function of the following expression, performs current model response filtering for the voltage command value $v^*_{d\_dcpl}$, which is an input value, and then outputs the filtered value as a d-axis non-interference voltage value $v^*_{d\_dcpl\_flt}$ to the adder 715.

[MATH. 6]

$$\frac{1}{\tau_m s + 1} \tag{6}$$

The adder 715 adds the d-axis voltage command value $v_{di}'$ to the d-axis non-interference voltage value $v^*_{d\_dcpl\_flt}$. As a result, the adder 715 calculates a current vector control voltage command value $v^*_{di}$ as represented by the following expression.

[MATH. 7]

$$v^*_{di} = v_{d\_dcpl\_flt} + v_{di}' \tag{7}$$

Figure 8:
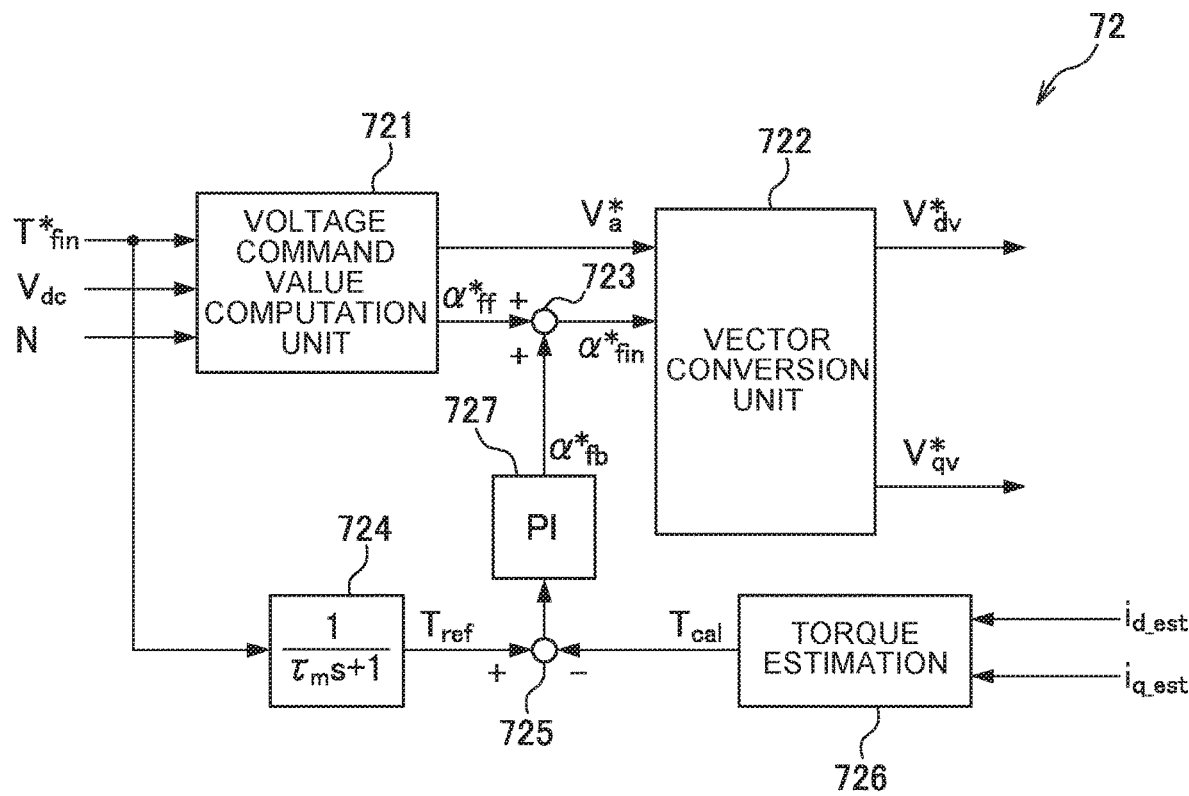
FIG. 8 is a detailed block diagram of a voltage phase control unit.

FIG. 8 is a block diagram illustrating the details of the control by the voltage phase control unit 72.

A voltage command value computation unit 721 calculates a voltage amplitude command value $V_a^*$ and a voltage phase command value $\alpha^*_{ff}$ on the basis of the inputs of the final torque command value $T^*_{fin}$, the rotation speed detection value N, and the battery voltage detection value $V_{dc}$ by using a previously stored table. The voltage command value computation unit 721 outputs the voltage amplitude command value $V_a^*$ to a vector conversion unit 722 and outputs the voltage phase command value $\alpha^*_{ff}$ to an adder 723.

A block 724, which includes a filter having the same characteristics as those of the current model response represented by expression (6), filters the input final torque command value $T^*_{fin}$, and calculates a norm torque $T_{ref}$ as represented by the following expression. The block 724 then outputs the norm torque $T_{ref}$ to a subtractor 725.

[MATH. 8]
$$T_{ref} = \frac{1}{\tau_m s + 1} T_{fin} \quad (8)$$

A torque estimation unit 726 calculates an estimated torque $T_{cal}$ on the basis of the input d-axis current estimated value $i_{d\_est}$ and q-axis current estimated value $i_{q\_est}$ and outputs the estimated torque $T_{cal}$ to the subtractor 725. Incidentally, the estimation processing by the torque estimation unit 726 is able to be represented by the following expression. In this expression, $L_d$ and $L_q$ indicate a d-axis inductance and a q-axis inductance, respectively, and $\Phi_a$ indicates a phase difference between voltage and current. Moreover, p indicates a predetermined constant.

[MATH. 9]
$$T_{cal} = p\{\Phi_a + (L_d - L_q) \cdot i_d\} i_q \quad (9)$$

The subtractor 725 subtracts the estimated torque $T_{cal}$ from the norm torque $T_{ref}$ and outputs a result of the subtraction to a PI computation unit 727.

The PI computation unit 727 PI-amplifies a deviation between the norm torque $T_{ref}$ and the estimated torque $T_{cal}$ calculated by the subtractor 725 to calculate a voltage phase correction value $\alpha^*_{fb}$. Specifically, the PI computation unit 727 performs the computation of the following expression. The PI computation unit 727 then outputs a result of the computation to the adder 723.

[MATH. 10]
$$\alpha^*_{fb} = \frac{K_p s + K_i}{s}(T_{ref} - T_{cal}) \quad (10)$$

The adder 723 adds the voltage phase command value $\alpha^*_{ff}$ to the voltage phase correction value $\alpha^*fb$ and outputs a result of the addition, $\alpha^*_{fin}$ to the vector conversion unit 722. The processing by the adder 723 is able to be represented by the following expression.

[MATH. 11]
$$\alpha^*_{fin} = \alpha^*_{ff} + \alpha^*_{fb} \quad (11)$$

The vector conversion unit 722 converts the input voltage amplitude command value $V_a^*$ and final voltage phase command value $\alpha^*_{fin}$ to dq-axis components by using the following expression. The vector conversion unit 722 then outputs a result of the conversion as the voltage phase control voltage command values $v^*_{dv}$ and $v^*_{qv}$.

[MATH. 12]
$$\begin{cases} v^*_{dv} = -V_a^* \sin \alpha^*_{fin} \\ v^*_{qv} = V_a^* \cos \alpha^*_{fin} \end{cases} \quad (12)$$

Figure 9:
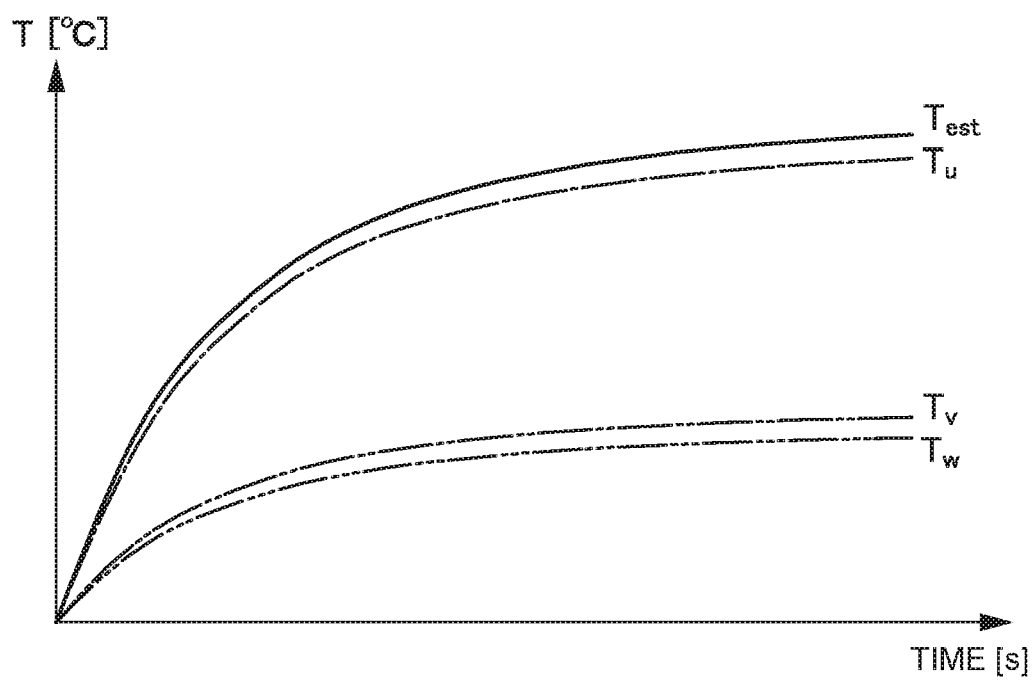
FIG. 9 is a diagram illustrating changes in temperature of a motor.

FIG. 9 is a diagram illustrating changes in temperature of the motor 2. According to this diagram, the estimated maximum temperature $T_{est}$ is indicated by a solid line, while the U-phase, V-phase, and W-phase winding temperatures $T_u$, $T_v$, and $T_w$ are indicated by an alternate long and short dash line, an alternate long and two short dashes line, and an alternate long and three short dashes line, respectively.

The estimated maximum temperature $T_{est}$ is predicted to be higher than the respective phase winding temperatures $T_u$, $T_v$, and $T_w$. Therefore, even in the case where the motor 2 is in a low rotation region and, for example, is locked, by which the current is applied only to the U-phase winding to cause the temperatures to be uneven in the motor 2, the estimated maximum temperature $T_{est}$ exceeds the U-phase winding temperature $T_u$ in the motor 2.

Therefore, the estimated maximum temperature $T_{est}$ is estimated so as to exceed the maximum temperature of the winding having a phase that reaches the highest temperature among the windings of the plurality of phases in the motor 2 in this manner and torque is limited by using the estimated maximum temperature $T_{est}$, thereby preventing insulation deterioration caused by heating in all windings in the motor 2.

According to the method of controlling the motor 2 of the first embodiment, one or more of the following advantageous effects may be achieved.

According to the method of controlling the motor 2 of the first embodiment, the transfer function G(s) of the winding temperature estimation unit 4 is able to be used to calculate the temperature that exceeds the maximum temperature of the winding having a phase that reaches the highest temperature among the windings of the plurality of phases in the motor 2 in accordance with the power loss $P_{loss}$ indicating the power to be input to the motor 2. In other words, the estimated maximum temperature $T_{est}$, which is estimated by the winding temperature estimation unit 4, exceeds the temperature of the winding having a phase (for example, the U phase) that reaches the highest temperature among the windings in the motor 2, even in the case where the motor 2 is in a low rotation region including a locked state in which a torque is generated in a state where the motor 2 is substantially not rotationally driven and the current continuously flows into a specific phase (for example, the U phase).

Thus, the torque is limited on the basis of the estimated maximum temperature $T_{est}$, by which, even if the motor 2 is in the low rotation region, the winding of any phase does not reach a too high temperature, thereby preventing insulation deterioration.

Furthermore, the motor 2 only needs to be provided with a thermometer for use in measuring the reference temperature $T_{base}$, and there is no need to mount temperature sensors on the windings of all phases, thereby enabling a reduction in production cost.

According to the method of controlling the motor 2 of the first embodiment, the low rotation state of the motor 2 includes a state in which the motor 2 is locked. In the case where the motor 2 is locked, the current is continuously applied only to a specific phase in a non-rotation state and therefore the unevenness in temperature in the motor 2 is extremely large. Accordingly, the estimated maximum temperature $T_{est}$ is estimated so as to exceed the maximum temperature of the windings in the motor 2, thereby preventing the insulation deterioration of the windings.

Second Embodiment

In the first embodiment, description has been made on an example of calculating the estimated changed temperature $\Delta T_{est}$ by using the transfer function G(s) in the winding temperature estimation unit 4. In the second embodiment, description will be made on an example of improving the accuracy of estimation of the estimated changed temperature $\Delta T_{est}$ by the winding temperature estimation unit 4 by initializing the transfer function G(s) at a predetermined timing.

Figure 10:
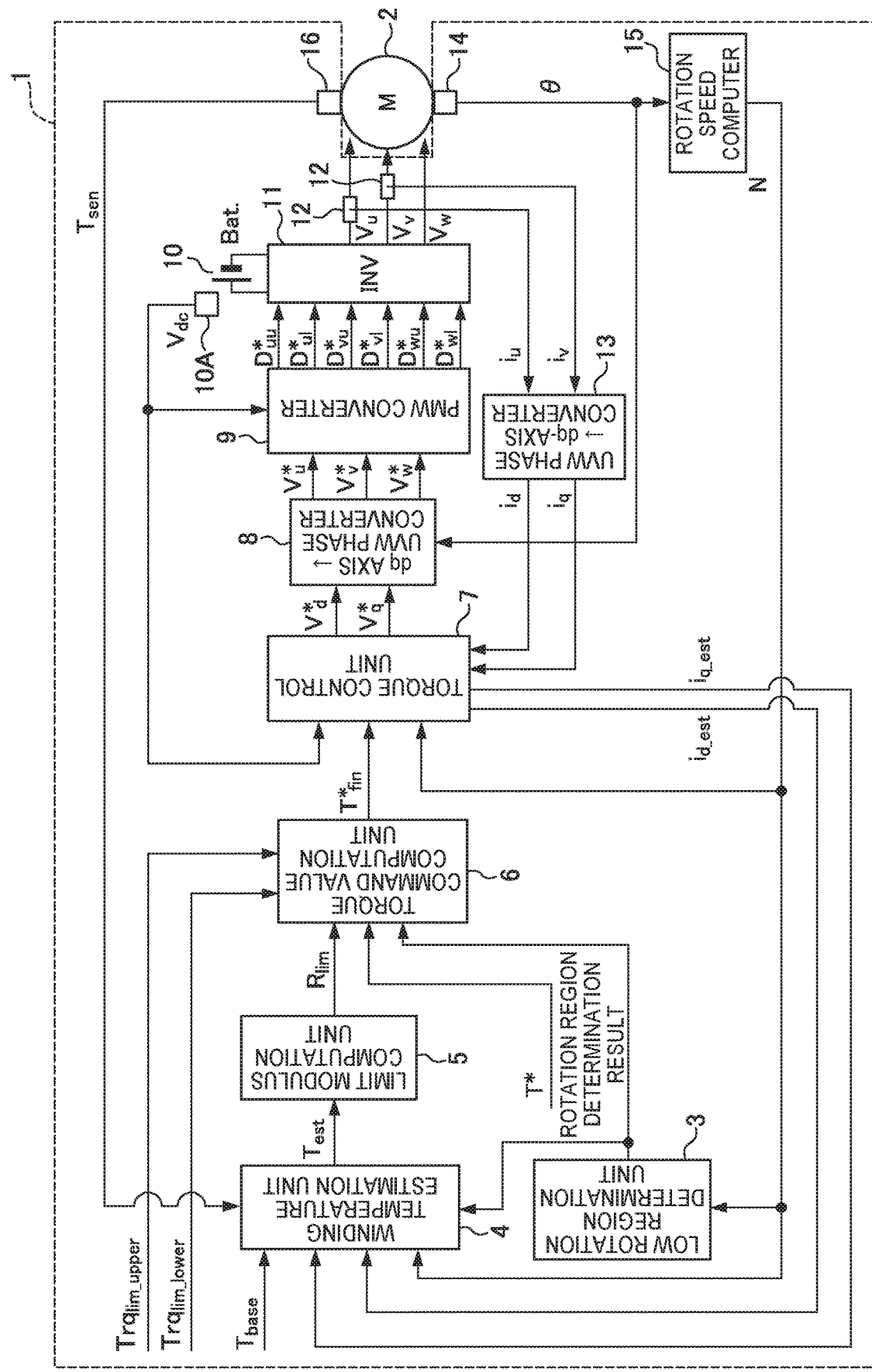
FIG. 10 is a schematic block diagram of a motor control device according to a second embodiment.

FIG. 10 is a schematic block diagram of a motor control device 1 according to the second embodiment.

Being compared with the motor control device 1 of the first embodiment illustrated in FIG. 1, the motor control device 1 in this diagram differs from the motor control device 1 of the first embodiment in that: there is further provided a temperature sensor 16 that measures the temperature of the winding of a certain phase (for example, the U phase) of the motor 2; a measured temperature $T_{sen}$ detected by the temperature sensor 16 is input to the winding temperature estimation unit 4; and the low rotation region determination unit 3 inputs a rotation region determination result to the winding temperature estimation unit 4.

Figure 11:
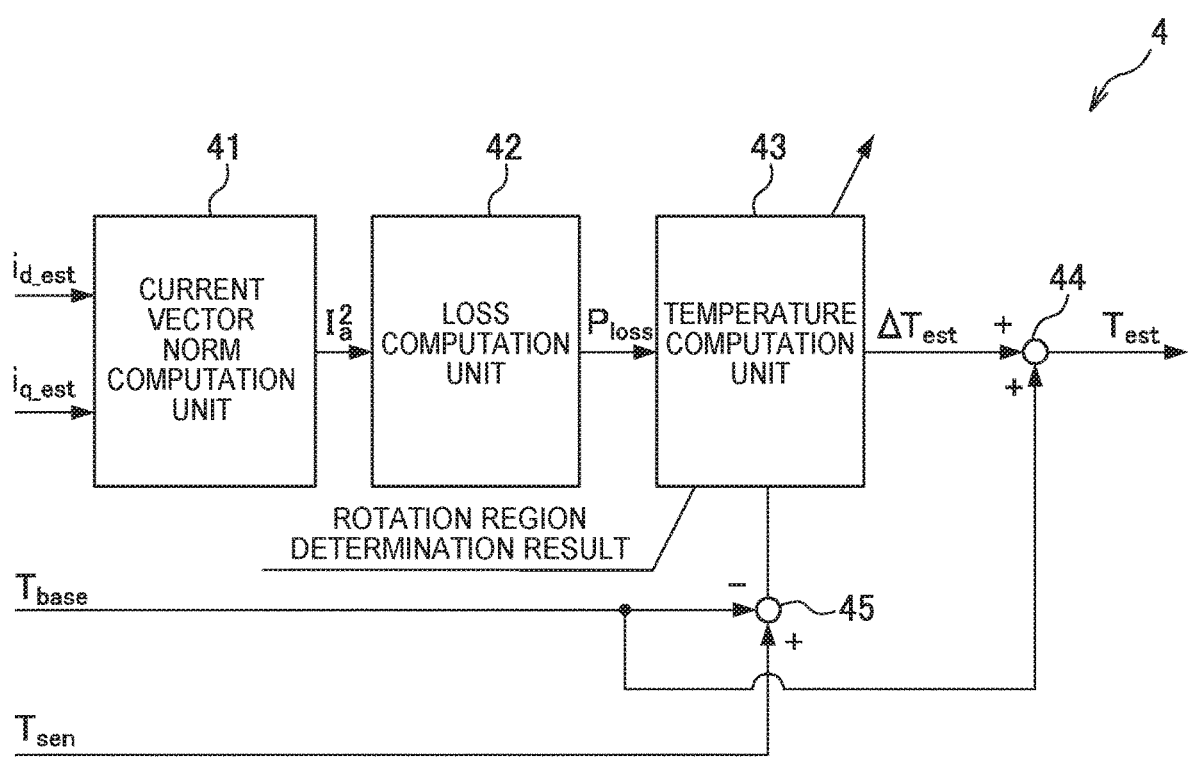
FIG. 11 is a detailed block diagram of a winding temperature estimation unit.

FIG. 11 is a detailed block diagram of the winding temperature estimation unit 4 according to the second embodiment.

Being compared with the winding temperature estimation unit 4 of the first embodiment illustrated in FIG. 3, the winding temperature estimation unit 4 illustrated in this diagram differs from the winding temperature estimation unit 4 of the first embodiment in that: a rotation region determination result is input to the temperature computation unit 43; a subtractor 45 is further provided; and a result of subtraction by the subtractor 45 is input to the temperature computation unit 43.

The winding temperature estimation unit 4 performs initialization processing for a filter indicated by the transfer function G(s) used to calculate the estimated changed temperature $\Delta T_{est}$ by using a value obtained by subtracting a reference temperature $T_{base}$ from a measured temperature $T_{sen}$ at a timing when the rotation region determination result changes from Hi (high rotation region) to Lo (low rotation region). This processing is equivalent to initializing a filter used for calculation processing of the finally calculated estimated maximum temperature $T_{est}$ with the measured temperature $T_{sen}$. In other words, the processing is equivalent to starting the estimation processing of the estimated maximum temperature $T_{est}$ with the measured temperature $T_{sen}$ as an initial value at the timing when the motor 2 transitions to the low rotation state.

Figure 12:
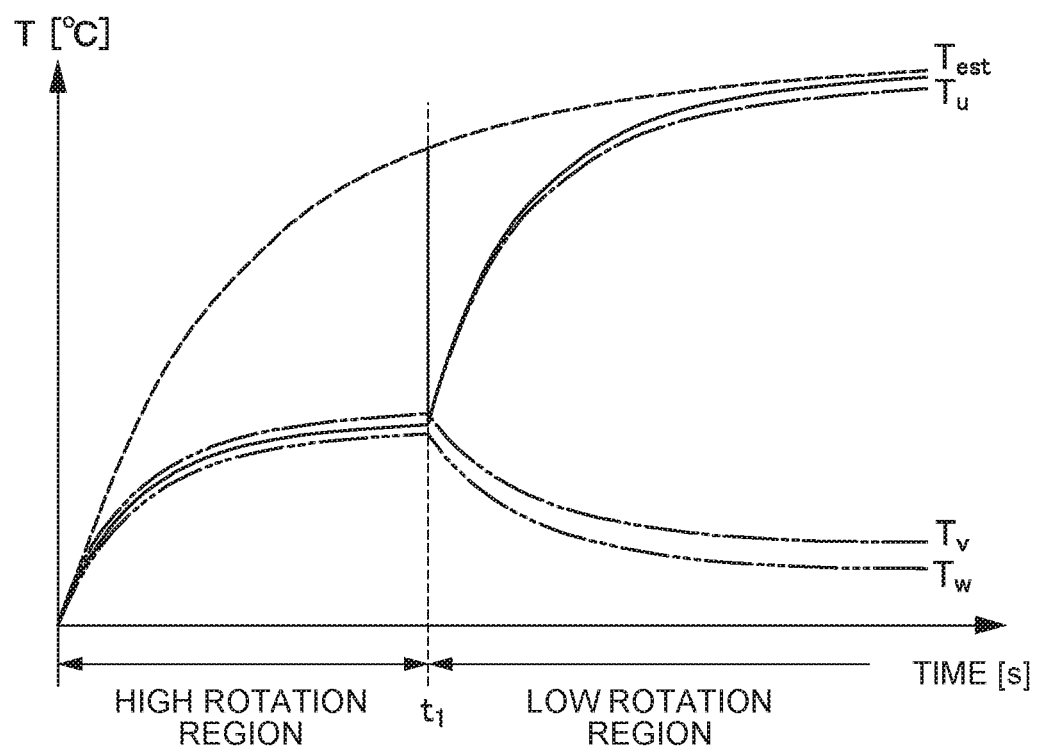
FIG. 12 is a diagram illustrating changes in temperature of a motor.

FIG. 12 is a diagram illustrating changes in temperature of the motor 2. According to this diagram, the estimated maximum temperature $T_{est}$ is indicated by a dotted line, while the U-phase, V-phase, and W-phase winding temperatures $T_u$, $T_v$, and $T_w$ are indicated by an alternate long and short dash line, an alternate long and two short dashes line, and an alternate long and three short dashes line, respectively.

According to this diagram, the dotted line indicates a case where the transfer function G(s) is not initialized at time $t_1$ when the motor 2 transitions to the low rotation region. In addition, a solid line indicates a case where the transfer function G(s) is initialized at time $t_1$.

As indicated by the dotted line, unless the transfer function G(s) is initialized at time $t_1$ when the motor 2 transitions to the low rotation region, the estimation step using the filter of the transfer function G(s) is performed in such a way that a result of the high rotation region is taken over also in the low rotation region. In other words, after the transition to the low rotation region, the estimated maximum temperature $T_{est}$ takes over a result of the computation in the high rotation region. Thereby, after the transition to the low rotation region, the estimated maximum temperature $T_{est}$ deviates from the U-phase temperature $T_u$, which is the maximum temperature in the motor 2, by which the estimation accuracy deteriorates.

Therefore, as indicated by the solid line, the filter of the transfer function G(s) is initialized on the basis of the measured temperature $T_{sen}$ at time $t_1$. This prevents the estimated maximum temperature $T_{est}$ from taking over a result of the estimation in the high rotation state in which the estimation accuracy is low, thereby increasing the estimation accuracy after the transition to the low rotation region.

According to the method of controlling the motor 2 of the second embodiment, one or more of the following advantageous effects may be achieved.

According to the method of controlling the motor 2 of the second embodiment, the filter of the transfer function G(s) of the winding temperature estimation unit 4 is designed in consideration of unevenness in temperature in the motor 2 in order to estimate the estimated maximum temperature $T_{est}$ in the motor 2 in the low rotation region. Therefore, the detected temperatures $T_u$, $T_v$, and $T_w$ are almost equal to each other in the high rotation region in which the temperatures are rather even, by which the estimation accuracy of the estimated maximum temperature $T_{est}$ is low.

If computation is continued with the filter of the same transfer function G(s) from the high rotation region, the estimated maximum temperature $T_{est}$ takes over a result of computation in the high rotation region immediately after the transition to the low rotation region, thereby deteriorating the estimation accuracy.

Therefore, the filter of the transfer function G(s) used for calculating the estimated maximum temperature $T_{est}$ is initialized on the basis of the measured temperature $T_{sen}$ at the time of transition to the low rotation state. This prevents the estimated maximum temperature $T_{est}$ from taking over the estimation result in the high rotation state in which the estimation accuracy is low, thereby enabling the estimation accuracy to increase after the transition to the low rotation region.

In other words, for the problem that the estimation accuracy of the estimated maximum temperature $T_{est}$ is low in the high rotation region, the filter of the transfer function G(s) is initialized using the measured temperature $T_{sen}$ at the time of transition from the high rotation region to the low rotation region, in other words, the estimation processing of the estimated maximum temperature $T_{est}$ with the measured temperature $T_{sen}$ is started, by which the estimated maximum temperature $T_{est}$ does not take over the calculation result of the high rotation region, thereby improving the estimation accuracy after the transition to the low rotation region.

Third Embodiment

In the second embodiment, description has been made on an example of using the measured temperature $T_{sen}$ for initializing the filter of the transfer function G(s). In the third embodiment, description will be made on another method of initializing the filter of the transfer function G(s) to further improve the estimation accuracy.

Figure 13:
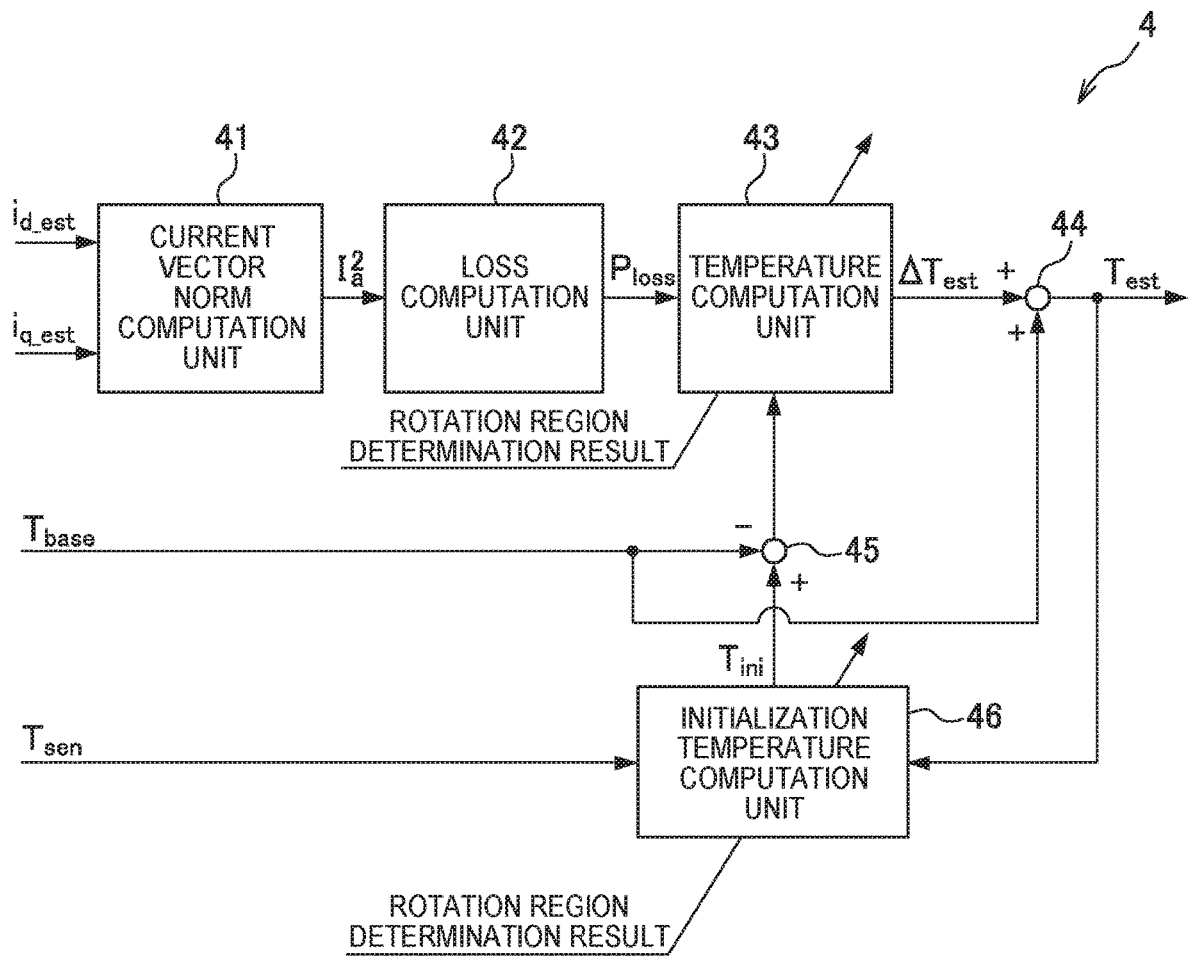
FIG. 13 is a schematic block diagram of a winding temperature estimation unit according to a third embodiment.

FIG. 13 is a detailed block diagram of a winding temperature estimation unit 4 according to a third embodiment. According to this diagram, being compared with the winding temperature estimation unit 4 of the second embodiment illustrated in FIG. 11, the winding temperature estimation unit 4 in this diagram differs from the winding temperature estimation unit 4 of the second embodiment in that the winding temperature estimation unit 4 further includes an initialization temperature computation unit 46.

The initialization temperature computation unit 46 outputs an initialization temperature $T_{ini}$ in response to the inputs of the measured temperature $T_{sen}$ and the rotation region determination result. A subtractor 45 subtracts a reference temperature $T_{base}$ from an initialization temperature $T_{ini}$ and outputs a result of the subtraction to a temperature computation unit 43. In addition, the subtraction result is used for initializing the filter of the transfer function G(s) in the temperature computation unit 43. For the last time, an adder 44 adds the estimated changed temperature $\Delta T_{est}$, which is a result of computation by the temperature computation unit 43, to the reference temperature $T_{base}$, by which the estimated maximum temperature $T_{est}$ is calculated. This operation of the winding temperature estimation unit 4 is equivalent to starting an estimation step of the estimated maximum temperature $T_{est}$ with the initialization temperature $T_{ini}$ as an initial value.

Figure 14:
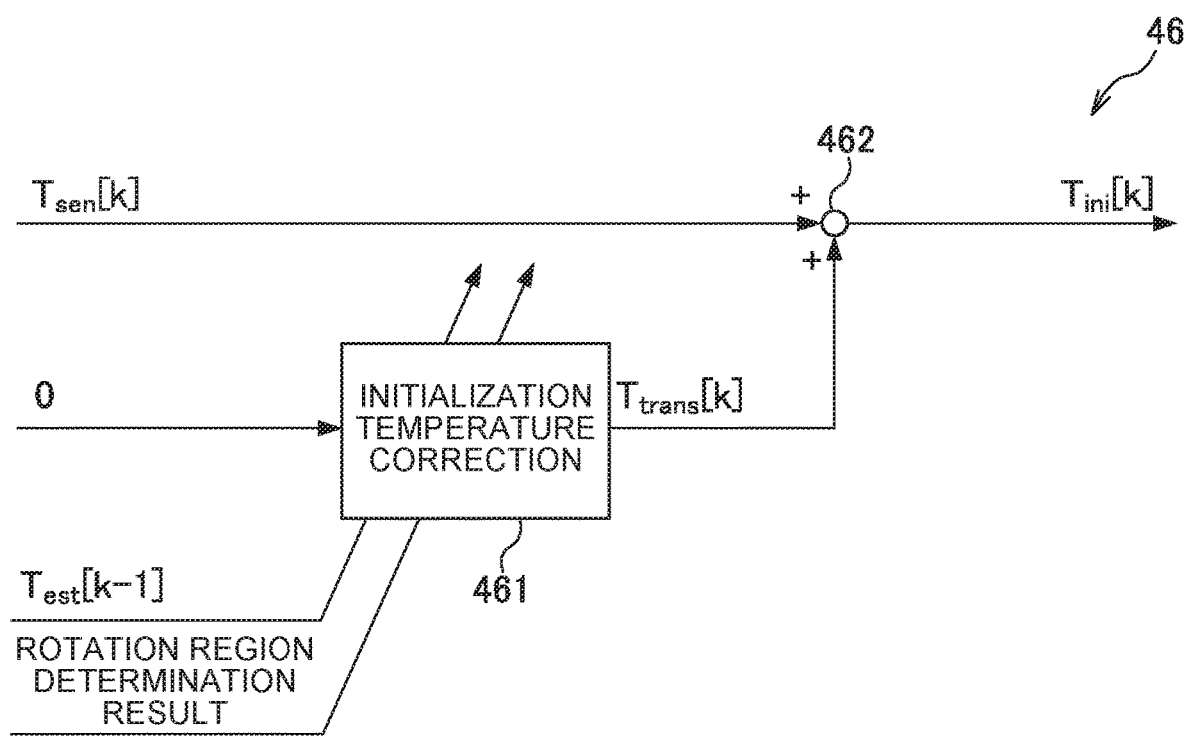
FIG. 14 is a schematic block diagram of an initialization temperature computation unit.

FIG. 14 is a detailed block diagram of the initialization temperature computation unit 46. The initialization temperature computation unit 46 includes an initialization temperature correction unit 461 and an adder 462. The initialization temperature correction unit 461 is an example of a configuration for performing a correction step.

The initialization temperature correction unit 461 receives inputs of a convergence value "0 (zero)," an estimated maximum temperature $T_{est}$ [k−1] of a previous value, and a rotation region determination result. In addition, an initialization correction temperature value $T_{trans}$ for use in correcting the initialization temperature $T_{ini}$ is output on the basis of the input values.

Incidentally, the initialization temperature correction unit 461 includes a filter H(s) computed only in the case where the motor 2 is in the high rotation region, and the initialization correction temperature $T_{trans}$ is calculated by using the filter H(s). In other words, the initialization correction temperature $T_{trans}$ changes after the transition to the high rotation region so as to converge from the estimated maximum temperature $T_{est}$, which is obtained at the transition, to zero.

The adder 462 then adds the measured temperature $T_{sen}$ to the initialization correction temperature $T_{trans}$ to calculate the initialization temperature $T_{ini}$ and outputs the calculated value to the subtractor 45 illustrated in FIG. 13. The initialization temperature $T_{ini}$ can be found as represented by the following expression.

[MATH. 13]

$$T_{ini}[k]=T_{sen}[k]+T_{trans}[k] \quad (13)$$

Thus, the initialization temperature $T_{ini}$ used for initializing the transfer function G(s) is corrected when the motor 2 transitions to the low rotation state. Specifically, the initialization temperature $T_{ini}$ is corrected by the initialization correction temperature $T_{trans}$ with respect to the measured temperature $T_{sen}$.

In the third embodiment, the corrected initialization temperature $T_{ini}$ is used as the estimated maximum temperature $T_{est}$ in the case where the motor 2 is in the high rotation state. Thereby, for the initialization temperature $T_{ini}$, the same estimated maximum temperature $T_{est}$ is used before and after the transition from the low rotation region to the high rotation region. At the transition from the high rotation region to the low rotation region, the filter of the transfer function G(s) of the temperature computation unit 43 is initialized with the initialization temperature $T_{ini}$, and therefore the same initialization temperature $T_{ini}$ is observed before and after the transition. This enables the change in the estimated maximum temperature $T_{est}$ to be smoothened.

As described above, the processing of the winding temperature estimation unit 4 is equivalent to starting the estimation processing of the estimated maximum temperature $T_{est}$ with the measured temperature $T_{sen}$ as an initial value at the timing when the motor 2 transitions to the low rotation state. In addition, the filter of the transfer function G(s) is used for the estimation processing of the estimated maximum temperature $T_{est}$, and the initialization is performed on the basis of the initialization temperature $T_{ini}$. Examining the operation of the third embodiment in the equivalent functions, the initialization temperature $T_{ini}$ is corrected and, at the transition timing to the high rotation state, the correction value starts to converge from the estimated maximum temperature $T_{est}$, which is obtained at the transition timing, to the measured temperature $T_{sen}$ in accordance with the characteristics of the filter H(s).

The filter H(s) is a transfer function having heat dissipation characteristics of the motor 2 and is the same as the transfer function G(s) of a thermal model used for the winding temperature estimation. In addition, the filter H(s) may be a transfer characteristic G'(s), which is a dominant part of G(s), as a heat dissipation characteristic.

Figure 15:
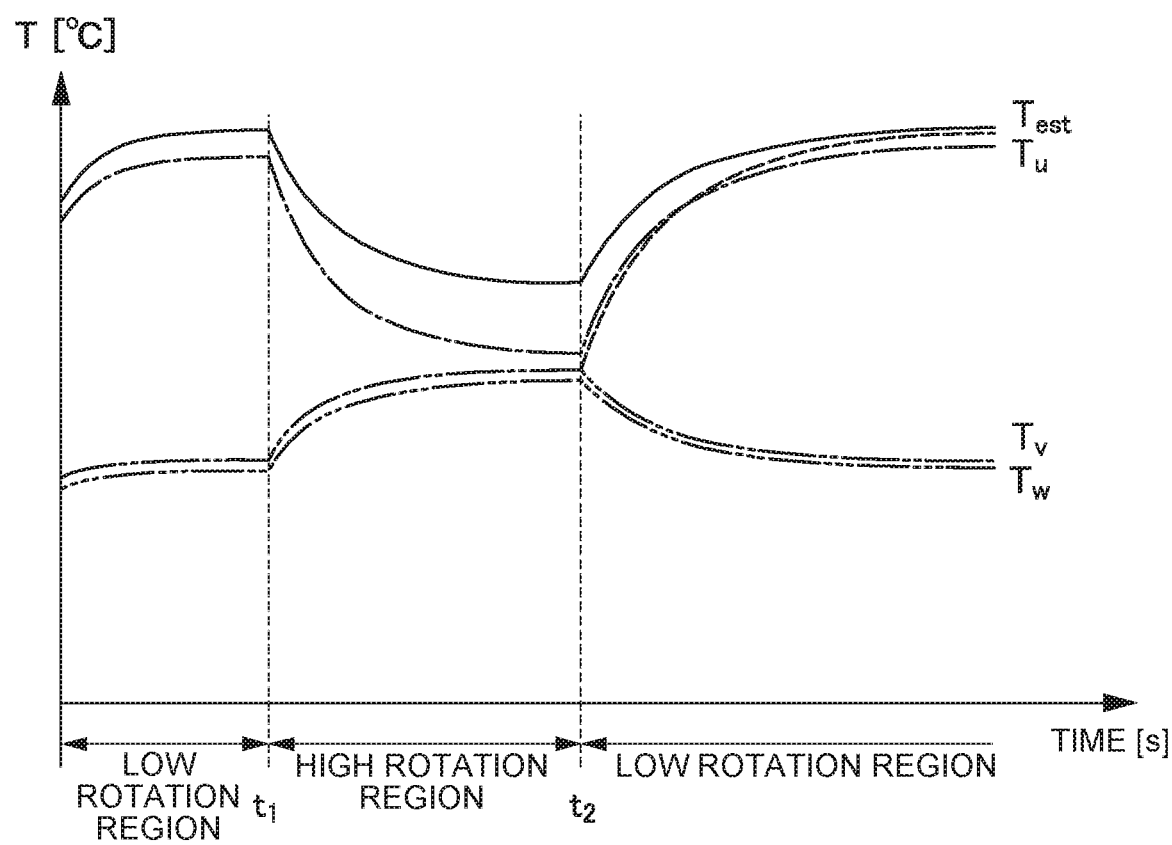
FIG. 15 is a diagram illustrating changes in temperature of a motor.

FIG. 15 is a diagram illustrating changes in temperature of the inside of the motor. According to this diagram, the V-phase and W-phase winding temperatures $T_u$, $T_v$, and $T_w$ are indicated by an alternate long and short dash line, an alternate long and two short dashes line, and an alternate long and three short dashes line, respectively. Furthermore, the motor 2 transitions to the low rotation region again at time $t_2$ after time $t_1$ at which the motor 2 transitions from the low rotation region to the high rotation region.

It is assumed that much current flows in the U phase until time $t_1$. Moreover, it is assumed that a temperature sensor 16 is provided on the V-phase winding and that the measured temperature $T_{sen}$ is equal to the V-phase temperature $T_v$. Additionally, the solid line indicates the estimated maximum temperature $T_{est}$. At time $t_2$ and thereafter, a dotted line indicates the estimated maximum temperature $T_{est}$ in the case where the correction in the third embodiment is not performed.

As described above, for the estimated maximum temperature $T_{est}$, the initialization temperature $T_{ini}$ is set between time $t_1$ and time $t_2$, which is the time period of the high rotation region. Furthermore, as indicated by a dotted line, in the case where the correction of the third embodiment is not performed, the estimated maximum temperature $T_{est}$ is initialized with the measured temperature $T_{sen}(T_v)$ at time $t_2$ at the time of transition to the low rotation region.

In the case where the time period from time $t_1$ to time $t_2$, namely, the time period of the high rotation region is short, temperatures are uneven in the motor 2 at time $t_2$. Therefore, the G(s) filter used for the low rotation region is designed based on the assumption that the temperatures are uneven in the motor 2, and thus the estimated maximum temperature $T_{est}$ calculated using the G(s) filter indicates the maximum temperature in the motor 2 more appropriately than the measured temperature $T_{sen}$.

Referring to FIG. 15, the U-phase temperature $T_u$, which is the maximum temperature in the motor 2 exceeds the measured temperature $T_{sen}(T_v)$ at time $t_2$. Therefore, if the transfer function G(s) filter is initialized by using the measured temperature $T_{sen}(T_v)$, the estimated maximum temperature $T_{est}$ (dotted line) is lower than the U-phase temperature $T_u$ in some sections at time $t_2$ and thereafter.

Therefore, the initialization temperature $T_{ini}$ is corrected as indicated by the solid line. This causes the initialization temperature $T_{ini}$ to exceed the temperatures of all phases at time $t_2$. The filter is then initialized by using the initialization temperature $T_{ini}$, by which an appropriate estimated maximum temperature $T_{est}$ is able to be found.

Incidentally, with the use of the initialization temperature $T_{ini}$ corrected as the estimated maximum temperature $T_{est}$ in the high rotation region from time $t_1$ to time $t_2$ as described above, the estimated maximum temperature $T_{est}$ sequentially changes at time $t_1$ and time $t_2$ at the transition between rotation regions.

According to the method of controlling the motor 2 of the third embodiment, one or more of the following advantageous effects may be achieved.

According to the method of controlling the motor 2 of the third embodiment, the initialization temperature $T_{ini}$ used for initializing the transfer function G(s) filter is corrected when the motor 2 transitions to the low rotation region. Specifically, with respect to the correction value used for the correction, correction is started at the transition timing to the high rotation region, and the initialization temperature $T_{ini}$ is a value that starts at the estimated maximum temperature $T_{est}$ and converges to the measured temperature $T_{sen}$ over time.

In the case of a short time period of the high rotation region, the tendency of unevenness in temperature remains in the motor 2 and therefore the estimated maximum temperature $T_{est}$ is more appropriate for filter initialization than the measured temperature $T_{sen}$. On the other hand, in the case of a long time period of the high rotation region, the unevenness in temperature in the motor 2 is eliminated over time and therefore the measured temperature $T_{sen}$ is more appropriate for filter initialization than the estimated maximum temperature $T_{est}$.

Therefore, as in the third embodiment, the initialization temperature $T_{ini}$ is corrected to a value that converges from the estimated maximum temperature $T_{est}$ to the measured temperature $T_{sen}$. Thereby, in the case of a short time period of the high rotation region, the initialization temperature $T_{ini}$ is corrected to a value close to the estimated maximum temperature $T_{est}$. On the other hand, in the case of a long time period of the high rotation region, the initialization temperature $T_{ini}$ is corrected to a value close to the measured temperature $T_{sen}$.

Accordingly, filter initialization is able to be performed by using an appropriate initialization temperature $T_{ini}$, thereby improving the estimation accuracy of the estimated maximum temperature $T_{est}$ and enabling appropriate current limitation.

According to the method of controlling the motor of the third embodiment, the convergence of the initialization temperature $T_{ini}$ follows H(s) having the heat dissipation characteristics of the motor 2. Incidentally, in the case of switching between the low rotation region and the high rotation region or in the case of a change in the rotation region after a long lapse of time, the estimation accuracy of the estimated maximum temperature $T_{est}$ is low and the reliability of the measured temperature $T_{sen}$ is low, too.

In the case where temperatures are uneven in the motor 2, the estimation accuracy of the estimated maximum temperature $T_{est}$ is high. On the other hand, in the case where temperatures are even in the motor 2, the measured temperature $T_{sen}$ is highly reliable. Therefore, the convergence from the estimated maximum temperature $T_{est}$ to the measured temperature $T_{sen}$ is caused to follow the heat dissipation characteristics of the motor 2, which determine the temperature change in the motor 2, thereby enabling accurate correction of the initialization temperature $T_{ini}$.

Fourth Embodiment

In the first to third embodiments, description has been made on the operations in the case where the motor 2 is in the low rotation region. In the fourth embodiment, description will be made on the operation in the case where the motor 2 is in the high rotation region.

Figure 16:
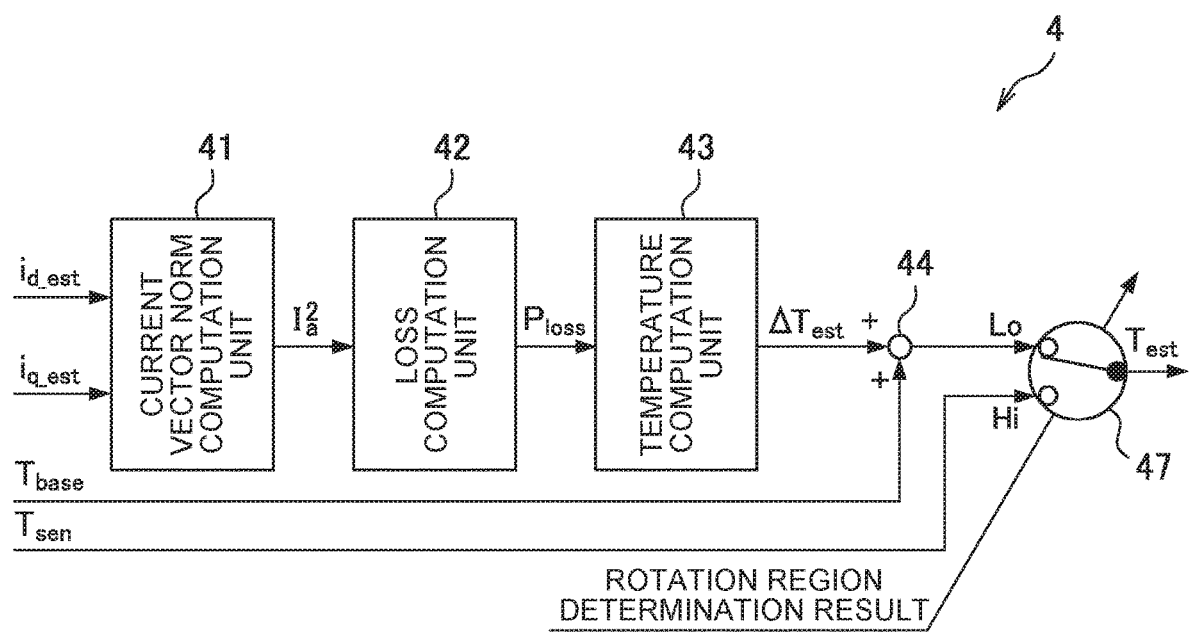
FIG. 16 is a schematic block diagram of a winding temperature estimation unit according to a fourth embodiment.

FIG. 16 is a block diagram illustrating the configuration of a winding temperature estimation unit 4 of the fourth embodiment. In this diagram, being compared with the winding temperature estimation unit 4 of the first embodiment illustrated in FIG. 3, the winding temperature estimation unit 4 in this diagram differs from the winding temperature estimation unit 4 of the first embodiment in that a switch 47 is provided.

The switch 47 receives inputs of an addition value output from an adder 44, a rotation region determination result, and a measured temperature $T_{sen}$. In the case where the rotation region determination result is Lo (low rotation region), the switch 47 outputs a result of addition output from the adder 44 as an estimated maximum temperature $T_{est}$. On the other hand, in the case where the rotation region determination result is Hi (high rotation region), the switch 47 outputs the measured temperature $T_{sen}$ as the estimated maximum temperature $T_{est}$.

Figure 17:
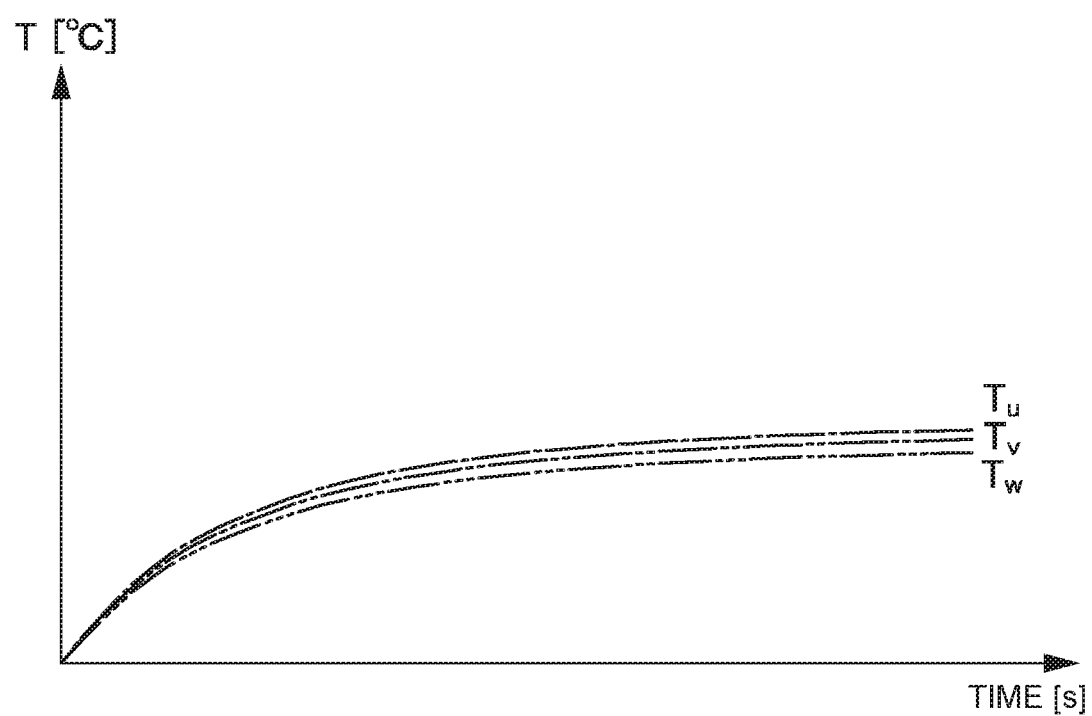
FIG. 17 is a diagram illustrating changes in temperature of a motor.

FIG. 17 illustrates detected temperatures $T_u$, $T_v$, and $T_w$ of three phases in the high rotation region. In the high rotation region, temperatures are even in the motor 2 and therefore the detected temperatures $T_u$, $T_v$, and $T_w$ indicate almost equal temperatures. Therefore, in the high rotation region, the measured temperature $T_{sen}$ is used as the estimated maximum temperature $T_{est}$, thereby improving the estimation accuracy of the estimated maximum temperature $T_{est}$.

In the case where the fourth embodiment is used in combination with the third embodiment, a corrected initialization temperature $T_{ini}$ may be used as the estimated maximum temperature $T_{est}$ to improve the estimation accuracy after the transition as described in the third embodiment, in a certain section after the transition from the low rotation region to the high rotation region.

According to the method of controlling the motor 2 of the fourth embodiment, one or more of the following advantageous effects may be achieved.

According to the method of controlling the motor 2 of the fourth embodiment, in the case where the motor 2 is in the high rotation region, unevenness in temperature is low in the motor 2 in comparison with the case where the motor 2 is in the low rotation region and therefore the measured temperature $T_{sen}$ is closer to the temperature of the winding of each phase of the motor 2 than the estimated maximum temperature $T_{est}$. Therefore, the use of the measured temperature $T_{sen}$ as the estimated maximum temperature $T_{est}$ makes it difficult to apply a brake with the current limitation and prevents the insulation deterioration.

Fifth Embodiment

In the first to second or to third embodiments, description has been made on an example of finding the estimated maximum temperature $T_{est}$ during a transition period between the high rotation region and the low rotation region by using the measured temperature $T_{sen}$. In the fifth embodiment, description will be made on an example of finding the estimated maximum temperature $T_{est}$ during the transition period without using the measured temperature $T_{sen}$.

Figure 18:
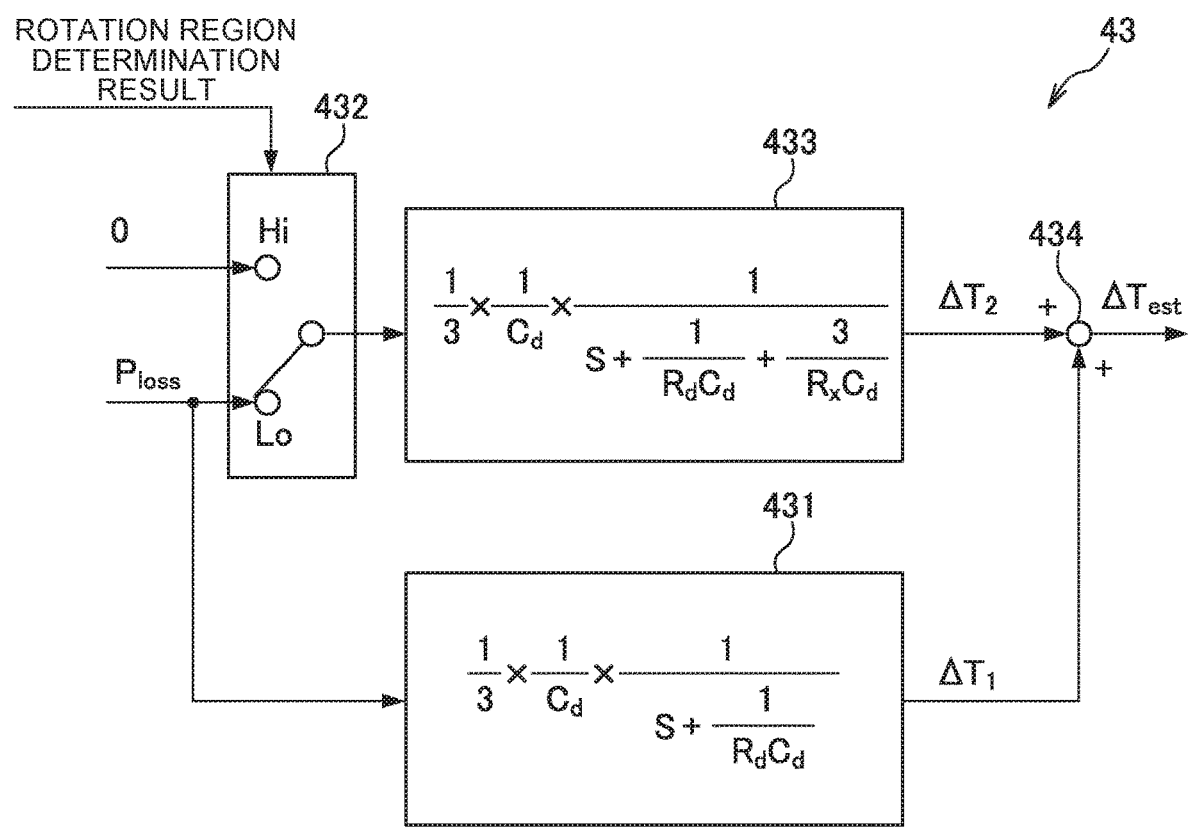
FIG. 18 is a schematic block diagram of a temperature computation unit according to a fifth embodiment.

FIG. 18 is a detailed block diagram of the temperature computation unit 43 of the fifth embodiment.

A first computation unit 431 receives an input of power loss $P_{loss}$ output from the loss computation unit 42 in FIG. 4. The first computation unit 431 has a transfer function represented by the following expression and calculates a first temperature rise $\Delta T_1$ in accordance with the transfer function.

[MATH. 14]
$$\frac{1}{3} \times \frac{1}{C_d} \times \frac{1}{s + \frac{1}{R_d C_d}} \tag{14}$$

A switch 432 receives inputs of a zero value, power loss $P_{loss}$, and a rotation region determination result. In the case where the rotation region determination result is Hi (high rotation region), the switch 432 outputs zero. In the case where the rotation region determination result is Lo (low rotation region), the switch 432 outputs power loss $P_{loss}$.

A second computation unit 433 has a transfer function represented by the following expression and calculates a second temperature rise $\Delta T_2$ in accordance with an input from the switch 432.

[MATH. 15]
$$\frac{1}{3} \times \frac{1}{C_d} \times \frac{1}{s + \frac{1}{R_d C_d} + \frac{3}{R_x C_d}} \tag{15}$$

An adder 434 adds a first temperature rise $\Delta T_1$ output from the first computation unit 431 to a second temperature rise $\Delta T_2$ output from the second computation unit 433 to calculate the estimated changed temperature $\Delta T_{est}$.

The first computation unit 431 is an example of a configuration for performing a first estimation step. The second computation unit 433 is an example of a configuration for performing a second estimation step. The adder 434 is an example of a configuration for performing an addition step.

The following describes the configurations of the first computation unit 431 and the second computation unit 433.

Figure 19:
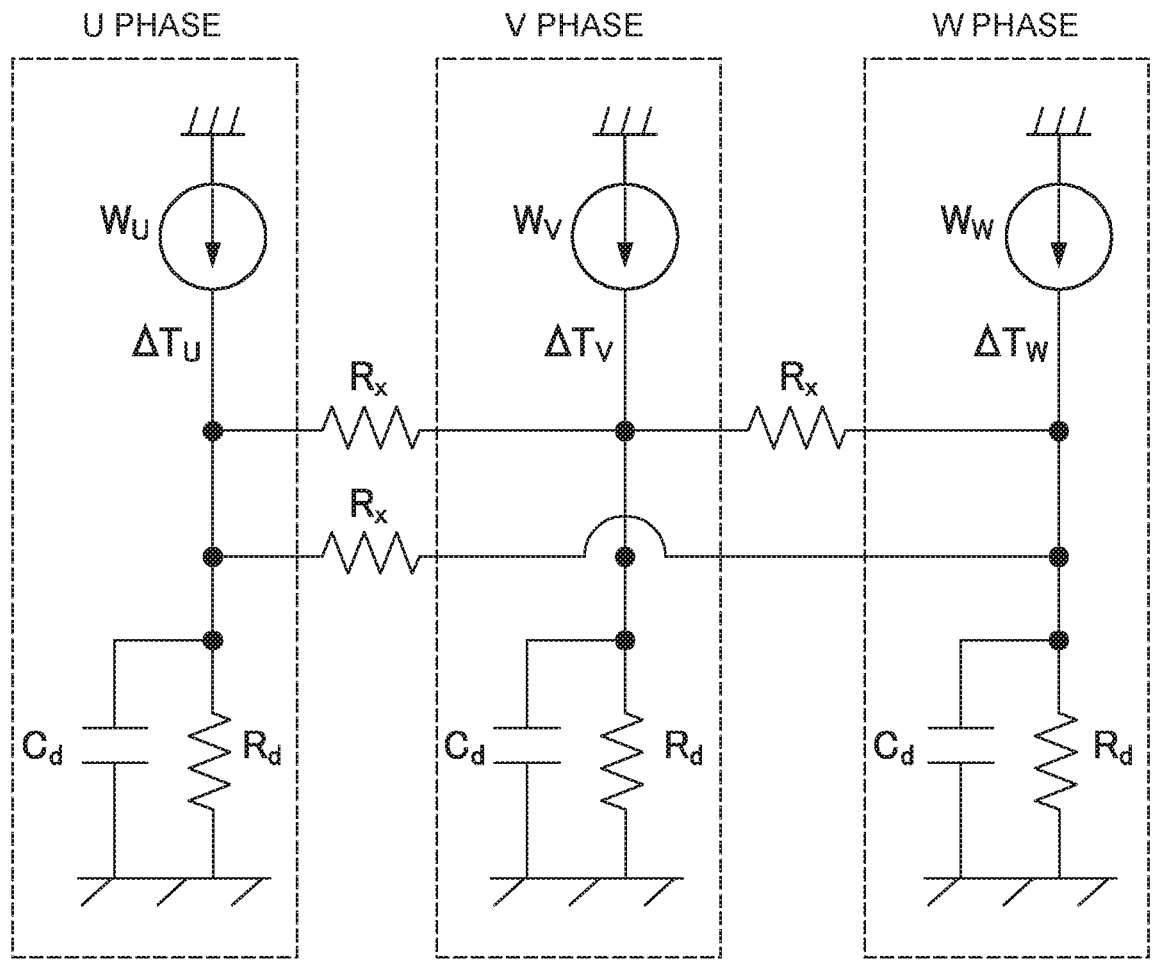
FIG. 19 is a diagram illustrating modeling of the amount of heat generation of a motor.

These configurations are calculated on the basis of circuits illustrated in FIG. 19. In this diagram, the magnitudes of input power to the windings of the U, V, and W phases are indicated by $W_u$, $W_v$, and $W_w$, respectively, and the increase temperatures of the windings of the U, V, and W phases are indicated by $\Delta T_u$, $\Delta T_v$, and $\Delta T_w$, respectively. Moreover, a resistive component $R_d$ and a capacitive component $C_d$ are illustrated in each of the U, V, and W phases and a resistive component $R_x$ is illustrated between the U, V, and W phases.

First, the case where the motor 2 is in the high rotation state will be described on the premise of this temperature circuit.

In the case where the motor 2 is in the high rotation state, substantially the same magnitude of power is applied to the U, V, and W phases and therefore the power loss $P_{loss}$ is distributed by one third thereof to each of $W_u$, $W_v$, and $W_w$.

Therefore, the increase temperatures $\Delta T_u$, $\Delta T_v$, and $\Delta T_w$ can be represented by the following determinant. The first term on the right-hand side is a component brought about by heat conduction and the second term on the right-hand side is a heat generating component according to the input power.

[MATH. 16]
$$\frac{d}{dt}\begin{bmatrix} \Delta T_U \\ \Delta T_V \\ \Delta T_W \end{bmatrix} = \frac{1}{C_d}\begin{bmatrix} -\frac{1}{R_d} - \frac{2}{R_x} & \frac{1}{R_x} & \frac{1}{R_x} \\ \frac{1}{R_x} & -\frac{1}{R_d} - \frac{2}{R_x} & \frac{1}{R_x} \\ \frac{1}{R_x} & \frac{1}{R_x} & -\frac{1}{R_d} - \frac{2}{R_x} \end{bmatrix}\begin{bmatrix} \Delta T_U \\ \Delta T_V \\ \Delta T_W \end{bmatrix} + \tag{16}$$
$$\frac{1}{C_d}\begin{bmatrix} 1/3 \\ 1/3 \\ 1/3 \end{bmatrix} P_{loss}$$

With this determinant, a high rotation increase temperature $\Delta T_{u\_hi}$, which is a U-phase increase temperature $\Delta T_u$ in the high rotation region, can be found as follows.

[MATH. 17]
$$\Delta T_{u\_hi} = \frac{1}{3} \times \frac{1}{C_d} \times \frac{1}{s + \frac{1}{R_d C_d}} \times P_{loss} \tag{17}$$

The following will study the low rotation state of the motor 2 such as, for example, a locked state thereof.

It is assumed that the maximum power is applied to the U-phase winding in the case where the motor 2 is in the low rotation state. In such a case, the V and W phases each have a phase difference of 120 degrees in comparison with the current input to the U phase, and therefore one half of the current of the U phase flows into each of the V and W phases. Since the power is proportional to the square of current, $W_u$ is four times as much as each of $W_v$ and $W_w$. Therefore, two-thirds of the input power loss $P_{loss}$ is distributed to $W_u$ and one-sixth thereof is distributed to each of $W_v$ and $W_w$.

Therefore, the increase temperatures $\Delta T_u$, $\Delta T_v$, and $\Delta T_w$ are able to be represented by the following determinant. Similarly to expression (16), the first term on the right-hand side is a component brought about by heat conduction and the second term on the right-hand side is a heat generating component according to the input power.

[MATH. 18]
$$\frac{d}{dt}\begin{bmatrix} \Delta T_U \\ \Delta T_V \\ \Delta T_W \end{bmatrix} = \frac{1}{C_d}\begin{bmatrix} -\frac{1}{R_d} - \frac{2}{R_x} & \frac{1}{R_x} & \frac{1}{R_x} \\ \frac{1}{R_x} & -\frac{1}{R_d} - \frac{2}{R_x} & \frac{1}{R_x} \\ \frac{1}{R_x} & \frac{1}{R_x} & -\frac{1}{R_d} - \frac{2}{R_x} \end{bmatrix}\begin{bmatrix} \Delta T_U \\ \Delta T_V \\ \Delta T_W \end{bmatrix} + \tag{18}$$
$$\frac{1}{C_d}\begin{bmatrix} 2/3 \\ 1/6 \\ 1/6 \end{bmatrix} P_{loss}$$

In consideration of the above expression (17) when this determinant is developed, the low rotation increase temperature $\Delta T_{u\_lo}$, which is an increase temperature $\Delta T_u$ of the U phase in the low rotation state, is able to be represented by the following expression.

[MATH. 19]

$$\Delta T_{u\_lo} = \frac{1}{3} \times \frac{1}{C_d} \times \frac{1}{s + \frac{1}{R_d C_d}} \times P_{loss} + \frac{1}{3} \times \frac{1}{C_d} \times \frac{1}{s + \frac{1}{R_d C_d} + \frac{3}{R_x C_d}} \times P_{loss} \quad (19)$$

The first term on the right-hand side of expression (19) is equal to the right-hand side of expression (17). Thereby, the first term on the right-hand side of expression (19) indicates the high rotation increase temperature $\Delta T_{u\_hi}$ in the high rotation state and the second term on the right-hand side indicates a further increase temperature caused by the low rotation state.

Specifically, in the case of the high rotation state, the high rotation increase temperature $\Delta T_{u\_hi}$ is able to be calculated by expression (17). In addition, in the case of the low rotation state, the low rotation increase temperature $\Delta T_{u\_lo}$ is able to be found by adding the second term on the right-hand side of expression (19) to the result of expression (17).

In other words, since the first term of expression (19) equal to expression (17) is present in both of the high rotation state and the low rotation state, it can be said that the first term is equivalent to the increase temperature independent of the rotation state. Furthermore, the second term of expression (19) indicates the increase temperature caused by the low rotation state.

Figure 20:
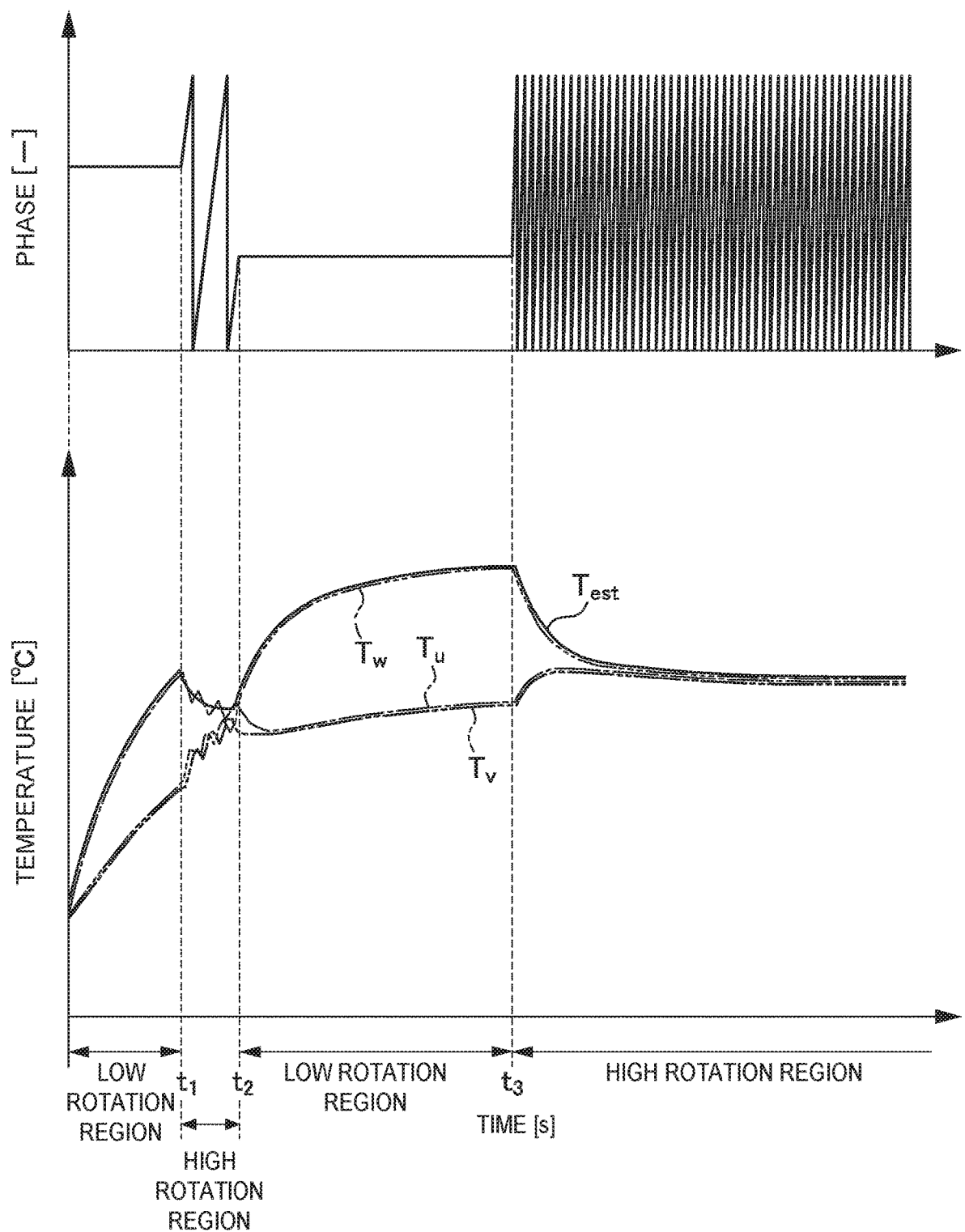
FIG. 20 is a diagram illustrating changes in temperature of the motor.

FIG. 20 illustrates the temperature state of the motor 2.

FIG. 20 illustrates a phase of the motor 2 in the upper part and illustrates the temperature of the motor 2 in the lower art. In addition, the estimated maximum temperature $T_{est}$ is indicated by a dotted line, while the U-phase, V-phase, and W-phase winding temperatures $T_u$, $T_v$, and $T_w$ are indicated by an alternate long and short dash line, an alternate long and two short dashes line, and an alternate long and three short dashes line, respectively.

According to this diagram, the motor 2 is in the low rotation region between time $t_0$ to time $t_1$ and between time $t_2$ and time $t_3$. The motor 2 is in the high rotation region between time $t_1$ and time $t_2$. The motor 2 is in the high rotation region at time $t_3$ and thereafter and the rotation speed at time $t_3$ and thereafter is higher than the rotation speed between time $t_1$ and time $t_2$.

During the time period between time to and time $t_1$, the motor 2 is locked and mainly power is applied to the U-phase wiring and therefore the U-phase temperature $T_u$ is higher than each of the V-phase temperature $T_v$ and the W-phase temperature $T_w$. Furthermore, the first computation unit 431 and the second computation unit 433 calculate the low rotation increase temperature $\Delta T_{u\_lo}$ according to expression (19), and therefore the estimated maximum temperature $T_{est}$, which is the low rotation increase temperature $\Delta T_{u\_lo}$, does not exceed the W-phase temperature $T_w$.

During the time period between time $t_1$ and time $t_2$, the motor 2 is rotating and power is applied to the windings of the respective phases in sequence, and therefore the U-phase temperature $T_u$, the V-phase temperature $T_v$, and the W-phase temperature $T_w$ converge to the same value while oscillating. At time $t_1$, the motor 2 transitions to the high rotation region and therefore the switch 432 switches the output to zero. Accordingly, the second temperature rise $\Delta T_2$ output from the second computation unit 433 converges to zero, and therefore the estimated maximum temperature $T_{est}$ converges to the sum of the reference temperature $T_{base}$ and the first temperature rise $\Delta T_1$. The first computation unit 431 calculates the high rotation increase temperature $\Delta T_{u\_hi}$ according to expression (17), and therefore the estimated maximum temperature $T_{est}$, which is the high rotation increase temperature $\Delta T_{u\_hi}$, does not exceed the maximum temperature of the winding of each phase.

During the time period between time $t_2$ and time $t_3$, the motor 2 is locked and mainly power is applied to the W-phase wiring and therefore the W-phase temperature $T_w$ is higher than each of the U-phase temperature $T_u$ and the V-phase temperature $T_v$. At time $t_2$, the motor 2 transitions to the low rotation region and therefore the switch 432 switches output to the power loss $P_{loss}$. Therefore, the second temperature rise $\Delta T_2$, which is output from the second computation unit 433, is a value appropriate to the power loss $P_{loss}$, and therefore the estimated maximum temperature $T_{est}$ increases over time. The first computation unit 431 and the second computation unit 433 calculate the low rotation increase temperature $\Delta T_{u\_lo}$ according to expression (19), and therefore the estimated maximum temperature $T_{est}$, which is the low rotation increase temperature $\Delta T_{u\_lo}$, does not exceed the W-phase temperature $T_w$.

At time $t_3$ and thereafter, the motor 2 is rotating and the rotation speed is higher than the rotation speed between time $t_2$ and time $t_3$. Power is applied to the windings of the respective phases in sequence, and therefore the U-phase temperature $T_u$, the V-phase temperature $T_v$, and the W-phase temperature $T_w$ converge to the same value. At time $t_3$, the switch 432 switches output to zero and therefore the second temperature rise $\Delta T_2$ output from the second computation unit 433 converges to zero. Accordingly, the high rotation increase temperature $\Delta T_{u\_hi}$ is calculated according to expression (17), and therefore the estimated maximum temperature $T_{est}$, which is the high rotation increase temperature $\Delta T_{u\_hi}$, does not exceed the maximum temperature of the winding of each phase.

Figure 21:
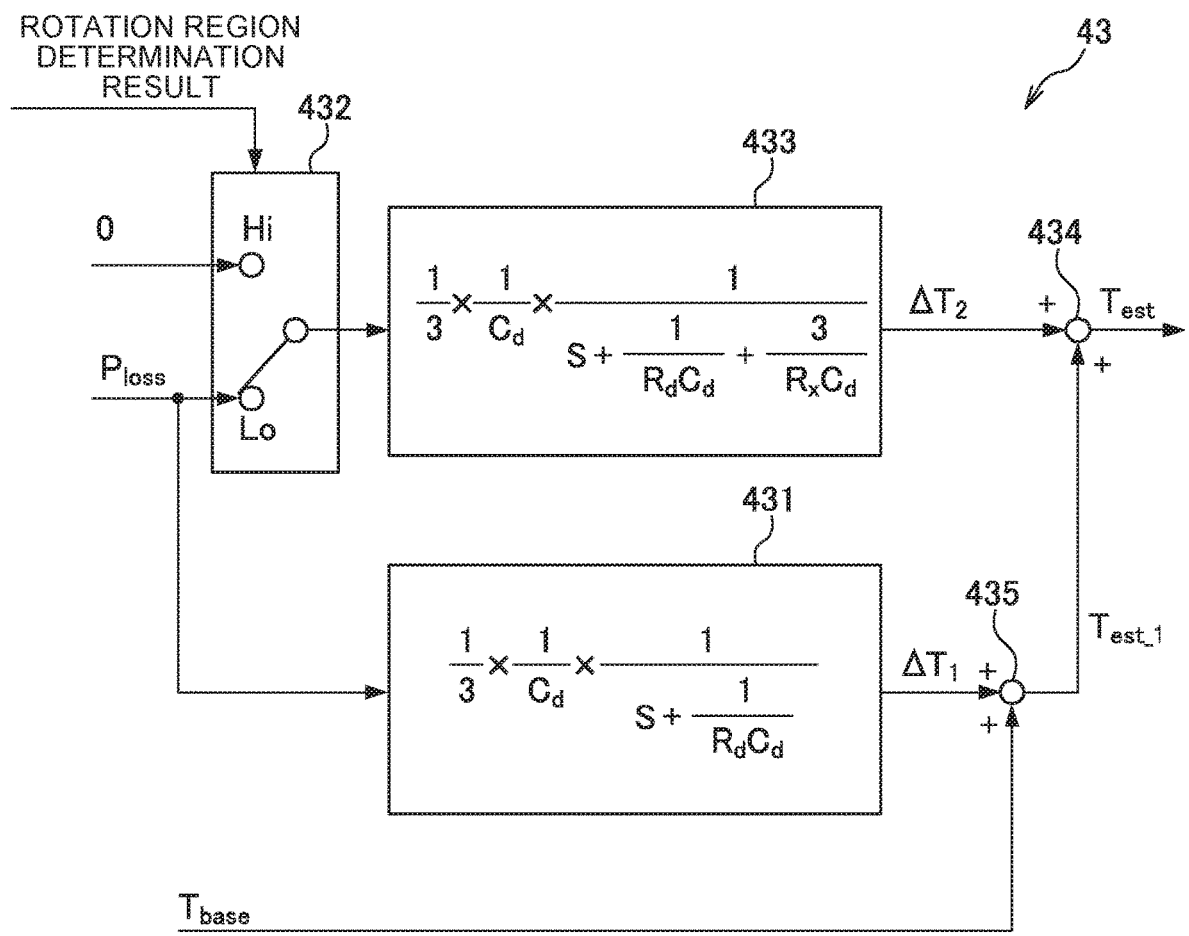
FIG. 21 is a detailed block diagram of a modification of an initialization temperature computation unit.

FIG. 21 is a part of a modification of the winding temperature estimation unit 4 of the fifth embodiment. An adder 435 adds the output of the first computation unit 431 to the reference temperature $T_{base}$ to calculate a first estimated temperature $T_{est\_1}$. Furthermore, the adder 434 adds the first estimated temperature $T_{est\_1}$ to the second temperature rise $\Delta T_2$, which is caused by the low rotation state, calculated by the second computation unit 433, thereby enabling the estimated maximum temperature $T_{est}$ to be found.

According to the method of controlling the motor 2 of the fifth embodiment, one or more of the following advantageous effects may be achieved.

According to the method of controlling the motor 2 of the fifth embodiment, a transition from the high rotation region to the low rotation region causes an addition of a second temperature rise $\Delta T_2$, which is calculated by the second computation unit 433, to a first estimated temperature $T_{est\_1}$, which is calculated by the first computation unit 431, to predict the estimated maximum temperature $T_{est}$. The first estimated temperature $T_{est\_1}$ is determined in accordance with the power applied to the motor 2 and does not change in accordance with the rotation state. By contrast, the second temperature rise $\Delta T$ indicates a temperature rise from the first estimated temperature $T_{est\_1}$, which is caused by that the motor 2 is in the low rotation state.

As another configuration, the estimated temperature at transition is also able to be found by finding an estimated temperature in each of the high rotation region and the low rotation region and then filtering the respective estimated temperatures and adding up their values in the case of transition between the rotation regions. In this another configuration, however, only general filtering is able to be performed and therefore the transition state cannot be modeled, which leads to low estimation accuracy.

In contrast, in the fifth embodiment, the estimated temperature is able to be found by using expression (19) in which the rotation regions are modeled in all sections including the transition period after transition between the rotation regions, thereby improving the estimation accuracy. In addition, although another configuration requires filter initialization or other processes, such processes are not required in the fifth embodiment, thereby achieving highly accurate estimation by simple computation.

According to the method of controlling the motor 2 of the fifth embodiment, the switch 432 outputs power loss $P_{loss}$ to the second computation unit 433 in the case of the low rotation region. This is because, in the low rotation region, the estimated maximum temperature $T_{est}$ is calculated by the sum of the first term on the right-hand side, which corresponds to the first computation unit 431, and the second term on the right-hand side, which corresponds to the second computation unit 433, as represented by expression (19). On the other hand, the switch 432 outputs zero to the second computation unit 433 in the case of the high rotation region. This is because there is no influence of an increase temperature caused by the low rotation region calculated by the second computation unit 433 in the high rotation region.

In the second term on the right-hand side corresponding to the second computation unit 433 includes "s," which is a differential component, and therefore, after switching of the switch 432, a change in increase temperature after the switching is able to be estimated. Thus, in the fifth embodiment, the transition period after switching between the rotation regions is also modeled and therefore the estimated maximum temperature $T_{est}$ is able to be calculated with higher accuracy.

While embodiments of the present invention have been described hereinabove, these embodiments are merely illustration of some of application examples of the present invention and the description is not intended to limit the technical scope of the present invention to the specific configurations of the above embodiments. Furthermore, the above embodiments may be combined on an optional basis.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of controlling a motor having windings of a plurality of phases, the method comprising:
   an estimation step of calculating a current vector norm from d-axis current and q-axis current flowing in the motor, calculating power loss from the current vector norm and the entire heat resistance of the motor, and estimating the maximum temperature of the windings of the plurality of phases based on the power loss and a transfer function for the power loss, the transfer function having first or higher-order transfer characteristics, in the case where the motor is in a low rotation state; and
   a limiting step of limiting input power based on the maximum temperature estimated in the estimation step.

2. The method of controlling the motor according to claim 1, wherein the low rotation state includes a state in which the motor is locked.

3. The method of controlling the motor according to claim 1, further comprising a measurement step of measuring the temperatures of some of windings of the plurality of phases, wherein the estimation step includes starting the estimation of the maximum temperature with the temperature measured in the measurement step as an initial value in the case where the motor transitions to the low rotation state.

4. The method of controlling the motor according to claim 3, further comprising a correction step of setting a correction value that starts at the maximum temperature estimated in the estimation step and converges to a temperature measured in the measurement step from when the motor transitions to a state other than the low rotation state and correcting the initial value by using the correction value at the start of the estimation step.

5. The method of controlling the motor according to claim 4, wherein the correction value converges according to heat dissipation characteristics of the motor in the correction step.

6. The method of controlling the motor according to claim 3, wherein the limiting step includes:
   limiting power applied to the motor based on the maximum temperature estimated in the estimation step in the case where the motor is in the low rotation state, and
   limiting power applied to the motor based on the temperature measured in the measurement step in the case where the motor is not in the low rotation state.

7. The method of controlling the motor according to claim 1, wherein the estimation step includes:
   a first estimation step of estimating a first estimated temperature independent of the motor rotation state in accordance with the input power,
   a second estimation step of estimating an increase temperature, which is caused by that the motor is in the low rotation state, for the first estimated temperature, and
   an addition step of adding the first estimated temperature and the increase temperature to each other and defining a result of the addition as the maximum temperature.

8. The method of controlling the motor according to claim 7, wherein the second estimation step includes:
   starting estimation in accordance with the input power for the increase temperature in the case where the motor transitions to the low rotation state, and
   starting estimation in accordance with the input of zero for the increase temperature in the case where the motor transitions to a state other than the low rotation state.

9. A method of controlling a motor having windings of a plurality of phases, the method comprising:
   an estimation step of estimating the maximum temperature of the windings having the plurality of phases, in accordance with the magnitude of input power that is input to the motor, in the case where the motor is in a low rotation state;
   a limiting step of limiting the input power based on the maximum temperature estimated by the estimation unit; and
   a measurement step of measuring the temperatures of some of windings of the plurality of phases, wherein the estimation step includes starting the estimation of the maximum temperature with the temperature measured in the measurement step as an initial value in the case where the motor transitions to the low rotation state.

10. The method of controlling the motor according to claim 9, further comprising:
a correction step of setting a correction value that starts at the maximum temperature estimated in the estimation step and converges to a temperature measured in the measurement step from when the motor transitions to a state other than the low rotation state and correcting the initial value by using the correction value at the start of the estimation step.

11. The method of controlling the motor according to claim 10, wherein the correction value converges according to heat dissipation characteristics of the motor in the correction step.

12. The method of controlling the motor according to claim 9, wherein the limiting step includes:
limiting power applied to the motor on the basis of the maximum temperature estimated in the estimation step in the case where the motor is in the low rotation state, and
limiting the power applied to the motor on the basis of the temperature measured in the measurement step in the case where the motor is not in the low rotation state.

13. A method of controlling a motor having windings of a plurality of phases, the method comprising:
an estimation step of estimating the maximum temperature of the windings of the plurality of phases, in accordance with the magnitude of input power that is input to the motor, in the case where the motor is in a low rotation state; and
a limiting step of limiting the input power on the basis of the maximum temperature estimated in the estimation step,
wherein the estimation step includes:
a first estimation step of estimating a first estimated temperature independent of the motor rotation state in accordance with the input power,
a second estimation step of estimating an increase temperature, which is caused by that the motor is in the low rotation state, for the first estimated temperature, and
an addition step of adding the first estimated temperature and the increase temperature to each other and defining a result of the addition as the maximum temperature.

14. The method of controlling the motor according to claim 13, wherein the second estimation step includes:
starting estimation in accordance with the input power for the increase temperature in the case where the motor transitions to the low rotation state, and
starting estimation in accordance with the input of zero for the increase temperature in the case where the motor transitions to a state other than the low rotation state.

15. A device of controlling a motor having windings of a plurality of phases, the device comprising:
an estimation unit that calculates a current vector norm from d-axis current and q-axis current flowing in the motor, calculates power loss from the current vector norm and the entire heat resistance of the motor, and estimates the maximum temperature of the windings of the plurality of phases on the basis of the power loss and a transfer function for the power loss, the transfer function having first- or higher-order transfer characteristics, in the case where the motor is in a low rotation state, and
a limiting unit that limits input power to the motor on the basis of the maximum temperature estimated by the estimation unit.

* * * * *